(12) United States Patent
Donepudi et al.

(10) Patent No.: US 12,166,686 B2
(45) Date of Patent: Dec. 10, 2024

(54) DATA CENTER MONITORING AND MANAGEMENT OPERATION INCLUDING AN EXTENSIBLE DATA FORWARDING OPERATION

(71) Applicant: Dell Products L.P., Round Rock, TX (US)

(72) Inventors: Venkata B. Donepudi, Round Rock, TX (US); Sudhir Vittal Shetty, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 83 days.

(21) Appl. No.: 18/072,098

(22) Filed: Nov. 30, 2022

(65) Prior Publication Data

US 2024/0179101 A1    May 30, 2024

(51) Int. Cl.
*H04L 47/625* (2022.01)

(52) U.S. Cl.
CPC .................. *H04L 47/625* (2013.01)

(58) Field of Classification Search
CPC .................................... H04L 47/625
See application file for complete search history.

(56) References Cited

U.S. PATENT DOCUMENTS

| | | | | |
|---|---|---|---|---|
| 10,805,222 B2 * | 10/2020 | Frangieh | .................. | H04L 67/34 |
| 10,949,253 B2 * | 3/2021 | Fletcher | ................ | G06F 16/316 |
| 2003/0179703 A1 * | 9/2003 | Levy | ........................ | H04L 43/00 370/230 |
| 2004/0057403 A1 * | 3/2004 | Jerbi | .................. | H04M 3/42382 370/349 |
| 2006/0059268 A1 * | 3/2006 | Victor | ...................... | H04L 49/90 709/231 |
| 2007/0112652 A1 * | 5/2007 | Ricketts | .................. | G06Q 10/00 705/30 |
| 2010/0049930 A1 * | 2/2010 | Pershin | ............... | G06F 11/1448 711/E12.103 |
| 2012/0066263 A1 * | 3/2012 | Wildermuth | .......... | G06F 16/254 707/792 |
| 2019/0312933 A1 * | 10/2019 | Richards | ........... | G06F 16/24552 |
| 2021/0173706 A1 * | 6/2021 | Wong | ........................ | G06N 7/01 |

* cited by examiner

*Primary Examiner* — Farley Abad
(74) *Attorney, Agent, or Firm* — Terrile, Cannatti & Chambers, LLP; Stephen A. Terrile

(57) ABSTRACT

A system, method, and computer-readable medium for performing a data center management and monitoring operation. The data center management and monitoring operation includes: identifying data forwarder configuration information for a plurality of data forwarders, the forwarder configuration information including scheduling information; scheduling collection of data from a data source according to the scheduling information; collecting data from a data source based upon the scheduling, the collecting using the forwarder configuration information to identify the data to be collected; formatting the data collected from the data source according to the data forwarder configuration information to provide formatted data; and, forwarding the formatted data to a recipient.

20 Claims, 9 Drawing Sheets

DATA CENTER MONITORING AND MANAGEMENT OPERATION INCLUDING AN EXTENSIBLE DATA FORWARDING OPERATION

BACKGROUND OF THE INVENTION

Field of the Invention

The present invention relates to information handling systems. More specifically, embodiments of the invention relate to performing a data center monitoring and management operation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a method for performing a data center management and monitoring operation, comprising: identifying data forwarder configuration information for a plurality of data forwarders, the forwarder configuration information including scheduling information; scheduling collection of data from a data source according to the scheduling information; collecting data from a data source based upon the scheduling, the collecting using the forwarder configuration information to identify the data to be collected; formatting the data collected from the data source according to the data forwarder configuration information to provide formatted data; and, forwarding the formatted data to a recipient.

In another embodiment the invention relates to a system comprising: a processor; a data bus coupled to the processor; a data center asset client module; and, a non-transitory, computer-readable storage medium embodying computer program code, the non-transitory, computer-readable storage medium being coupled to the data bus, the computer program code interacting with a plurality of computer operations and comprising instructions executable by the processor and configured for: identifying data forwarder configuration information for a plurality of data forwarders, the forwarder configuration information including scheduling information; scheduling collection of data from a data source according to the scheduling information; collecting data from a data source based upon the scheduling, the collecting using the forwarder configuration information to identify the data to be collected; formatting the data collected from the data source according to the data forwarder configuration information to provide formatted data; and, forwarding the formatted data to a recipient.

In another embodiment the invention relates to a computer-readable storage medium embodying computer program code, the computer program code comprising computer executable instructions configured for: identifying data forwarder configuration information for a plurality of data forwarders, the forwarder configuration information including scheduling information; scheduling collection of data from a data source according to the scheduling information; collecting data from a data source based upon the scheduling, the collecting using the forwarder configuration information to identify the data to be collected; formatting the data collected from the data source according to the data forwarder configuration information to provide formatted data; and, forwarding the formatted data to a recipient.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
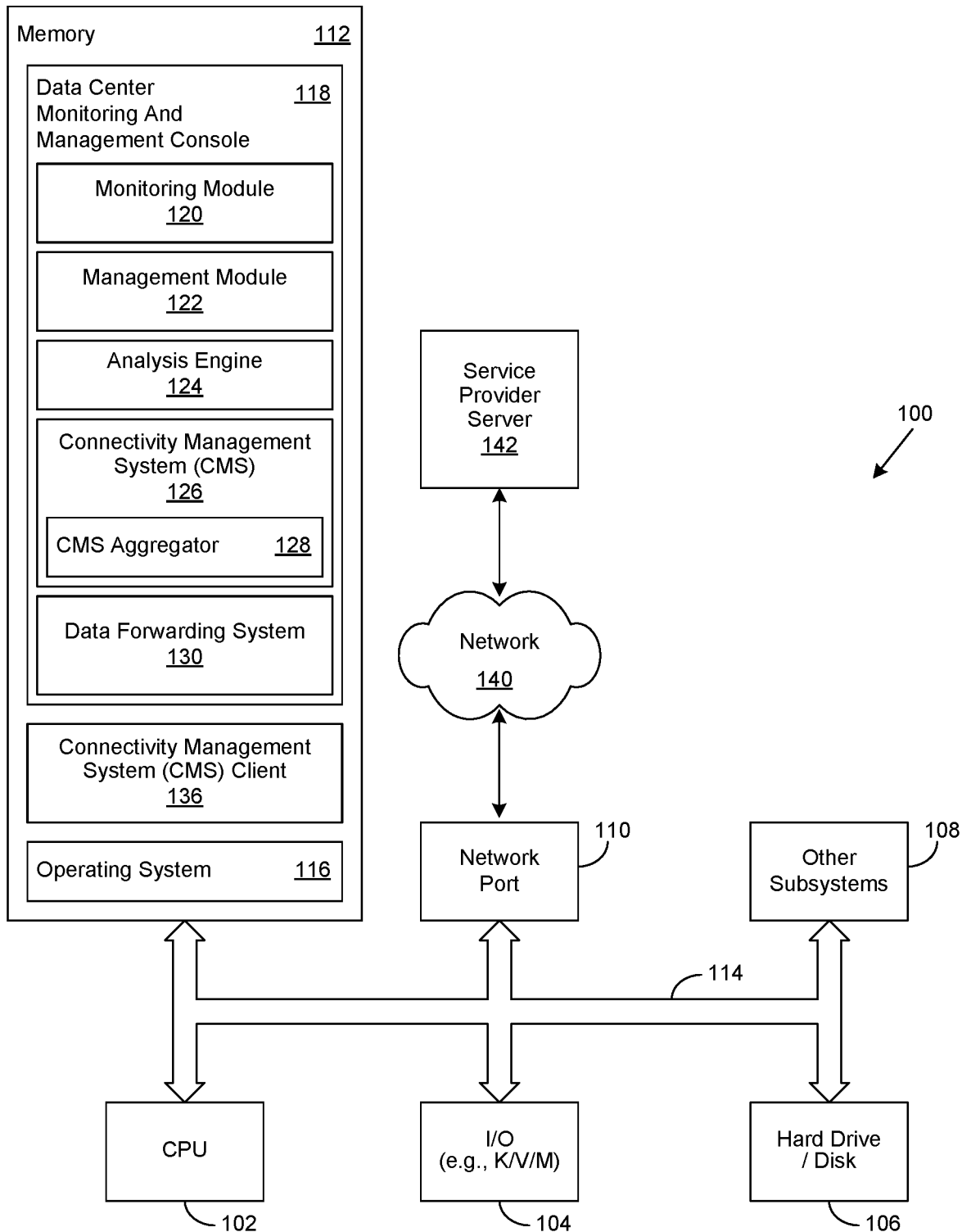
FIG. 1 shows a general illustration of components of an information handling system as implemented in the system and method of the present invention.

A system, method, and computer-readable medium are disclosed for performing a data center monitoring and management operation, described in greater detail herein. Various aspects of the disclosure reflect an appreciation that it is common for a typical data center to monitor and manage large numbers of different assets, such as certain computing and networking devices, likewise described in greater detail herein. Certain aspects of the disclosure likewise reflect an appreciation that such data center assets are typically implemented to work in combination with one another for a particular purpose. Likewise, various aspects of the disclosure reflect an appreciation that such purposes generally involve the performance of a wide variety of tasks, operations, and processes to service certain workloads.

Certain aspects of the disclosure likewise reflect an appreciation that the use of data center management systems, whether they are on-premise or cloud-based, often prove to be advantageous as they typically allow monitoring and management functions to be performed according to the user's particular needs. However, various aspects of the invention likewise reflect an appreciation that the use of such data center management systems may pose certain challenges.

In system management applications, it is required to forward different types of data (Inventory, Alerts, Metrics, Health, Logs) to external consumers. The data forwarding methodology should have the flexibility to transfer this data at different schedules and formats based on various filters such as type of device, device groups and data attributes. It should also have the pluggability and extensibility by dynamically adding new data forwarders and support both full and incremental data transfers.

A system, method, and computer-readable medium for performing a data center monitoring and management operation which includes an extensible data forwarding operation. In various embodiments, the data center monitoring and management operation defines a flexible model that abstracts different aspects of the data forwarding to achieve extensibility. Abstracting the data forwarding modules provides flexibility to maintain different configurations for different data forwarders and allows pluggability at each software component. In certain embodiments, a data forwarder includes software components that collect, format, stream and forward data based on the unique needs of each forwarder.

In various embodiments, the extensible data forwarding operation forwards data in a plurality of configurations. In various embodiments, the plurality of configurations include one or more of a schedule configuration, a device type configuration, a category of data configuration, a device group configuration and a data attribute configuration. In certain embodiments, the schedule configuration is based on a frequency of transfer of the data. In certain embodiments, the device type configuration is based on a type of device associated with the data (e.g., servers, chassis or Network IOMs). In certain embodiments the category of data configuration is based on a category associated with the data (e.g., inventory data, health data, alert data, metrics data or log data). In certain embodiments, the device group configuration is based on a device group associated with the data (e.g., a static device group or a query device group). In certain embodiments, the data attribute configuration is based on one or more attributes associated with the data (e.g., a severity attribute, a health attribute or an alert attribute).

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a data center monitoring and management console 118, or a connectivity management system (CMS) client 136. In one embodiment, the information handling system 100 is able to download the data center monitoring and management console 118, or the CMS client 136, or both, from the service provider server 142. In another embodiment, the functionality respectively provided by the data center monitoring and management console 118, or the CMS client 136, or both, may be provided as a service from the service provider server 142.

In certain embodiments, the data center monitoring and management console 118 may include a monitoring module 120, a management module 122, an analysis engine 124, a connectivity management system (CMS) 126, an extensible data forwarding resource utilization system 130, or a combination thereof. In certain embodiments, the CMS 126 may be implemented to include a CMS aggregator 128. In certain embodiments, the data center monitoring and management console 118 may be implemented to perform a data center monitoring and management operation. In certain embodiments, the information handling system 100 may be implemented to include either a CMS 126, or a CMS client 136, or both.

In certain embodiments, the data center monitoring and management operation may be performed during operation of an information handling system 100. In various embodiments, performance of the data center monitoring and management operation may result in the realization of improved monitoring and management of certain data center assets, as described in greater detail herein. In certain embodiments, the CMS 126 may be implemented in combination with the CMS client 136 to perform a connectivity management operation, described in greater detail herein. As an example, the CMS 126 may be implemented on one information handling system 100, while the CMS client 136 may be implemented on another, as likewise described in greater detail herein.

Figure 2:
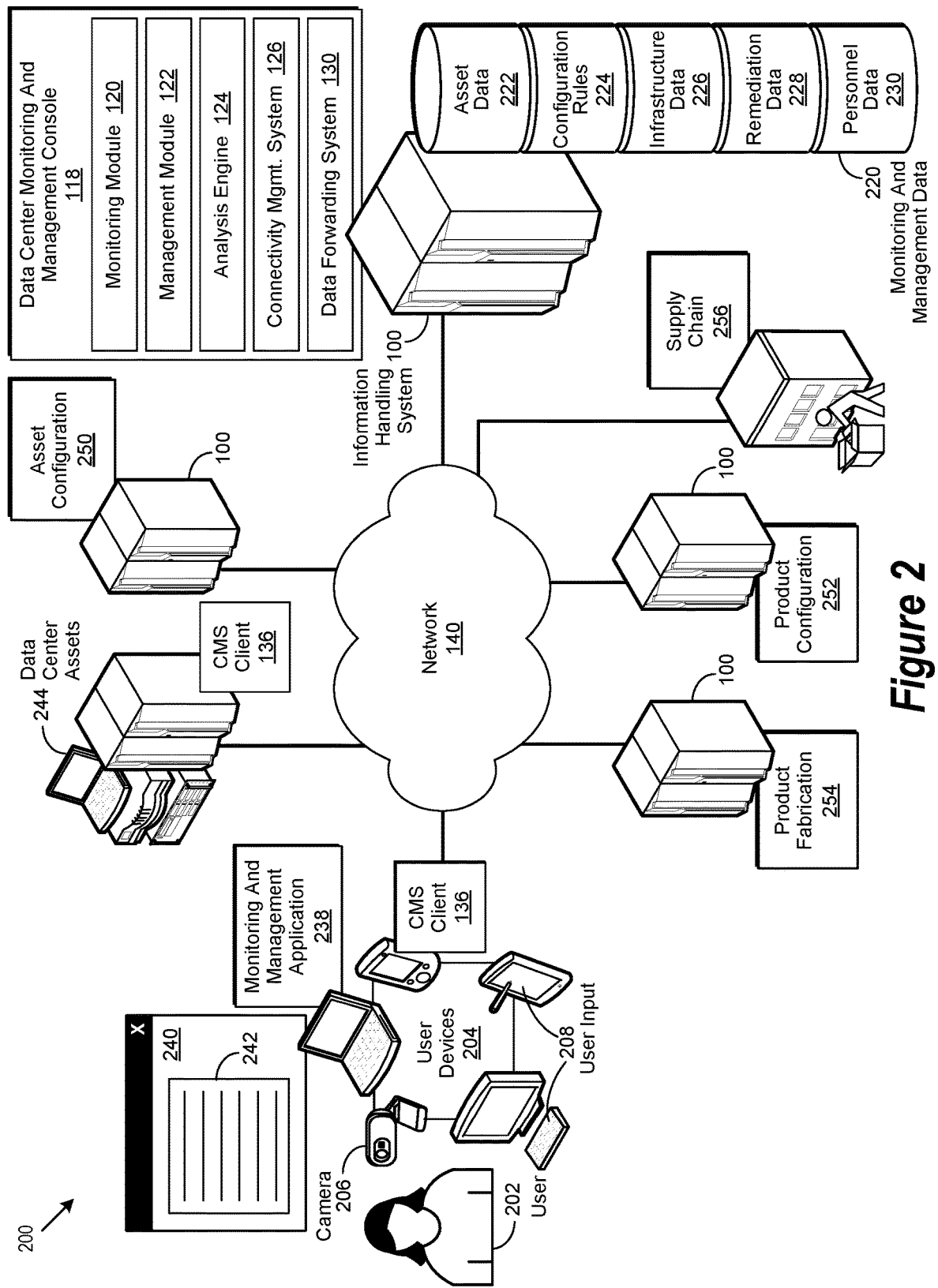
FIG. 2 shows a block diagram of a data center system monitoring and management environment.

FIG. 2 is a simplified block diagram of a data center monitoring and management environment implemented in accordance with an embodiment of the invention. As used herein, a data center broadly refers to a building, a dedicated space within a building, or a group of buildings, used to house a collection of interrelated data center assets 244 implemented to work in combination with one another for a particular purpose. As likewise used herein, a data center asset 244 broadly refers to anything, tangible or intangible, that can be owned, controlled, or enabled to produce value as a result of its use within a data center. In certain embodiments, a data center asset 244 may include a product, or a service, or a combination of the two.

As used herein, a tangible data center asset 244 broadly refers to a data center asset 244 having a physical substance, such as a computing or network device. Examples of computing devices may include personal computers (PCs), laptop PCs, tablet computers, servers, mainframe computers, Redundant Arrays of Independent Disks (RAID) storage units, their associated internal and external components, and so forth. Likewise, examples of network devices may include routers, switches, hubs, repeaters, bridges, gateways, and so forth. Other examples of a tangible data center asset 244 may include certain data center personnel, such as a data center system administrator, operator, or technician, and so forth. Other examples of a tangible data center asset 244 may include certain maintenance, repair, and operations (MRO) items, such as replacement and upgrade parts for a particular data center asset 244. In certain embodiments, such MRO items may be in the form of consumables, such as air filters, fuses, fasteners, and so forth.

As likewise used herein, an intangible data center asset 244 broadly refers to a data center asset 244 that lacks physical substance. Examples of intangible data center assets 244 may include software applications, software services, firmware code, and other non-physical, computer-based assets. Other examples of intangible data center assets 244 may include digital assets, such as structured and unstructured data of all kinds, still images, video images, audio recordings of speech and other sounds, and so forth. Further examples of intangible data center assets 244 may include intellectual property, such as patents, trademarks, copyrights, trade names, franchises, goodwill, and knowledge resources, such as data center asset 244 documentation. Yet other examples of intangible data center assets 244 may include certain tasks, functions, operations, procedures, or processes performed by data center personnel. Those of skill in the art will recognize that many such examples of tangible and intangible data center assets 244 are possible. Accordingly, the foregoing is not intended to limit the spirit, scope or intent of the invention.

In certain embodiments, the value produced by a data center asset 244 may be tangible or intangible. As used herein, tangible value broadly refers to value that can be measured. Examples of tangible value may include return on investment (ROI), total cost of ownership (TCO), internal rate of return (IRR), increased performance, more efficient use of resources, improvement in sales, decreased customer support costs, and so forth. As likewise used herein, intangible value broadly refers to value that provides a benefit that may be difficult to measure. Examples of intangible value may include improvements in user experience, customer support, and market perception. Skilled practitioner of the art will recognize that many such examples of tangible and intangible value are possible. Accordingly, the foregoing is not intended to limit the spirit, scope or intent of the invention.

In certain embodiments, the data center monitoring and management environment 200 may include a data center monitoring and management console 118. In certain embodiments, the data center monitoring and management console 118 may be implemented to perform a data center monitoring and management operation. As used herein, a data center monitoring and management operation broadly refers to any task, function, procedure, or process performed, directly or indirectly, within a data center monitoring and management environment 200 to procure, deploy, configure, implement, operate, monitor, manage, maintain, or remediate a data center asset 244.

In certain embodiments, a data center monitoring and management operation may include a data center monitoring task. As used herein, a data center monitoring task broadly refers to any function, operation, procedure, or process performed, directly or indirectly, within a data center monitoring and management environment 200 to monitor the operational status of a particular data center asset 244. In various embodiments, a particular data center asset 244 may be implemented to generate an alert if its operational status exceeds certain parameters. In these embodiments, the definition of such parameters, and the method by which they may be selected, is a matter of design choice.

For example, an internal cooling fan of a server may begin to fail, which in turn may cause the operational temperature of the server to exceed its rated level. In this example, the server may be implemented to generate an alert, which provides notification of the occurrence of a data center issue. As used herein, a data center issue broadly refers to an operational situation associated with a particular component of a data monitoring and management environment 200, which if not corrected, may result in negative consequences. In certain embodiments, a data center issue may be related to the occurrence, or predicted occurrence, of an anomaly within the data center monitoring and management environment 200. In certain embodiments, the anomaly may be related to unusual or unexpected behavior of one or more data center assets 244.

In certain embodiments, a data center monitoring and management operation may include a data center management task. As used herein, a data center management task broadly refers to any function, operation, procedure, or process performed, directly or indirectly, within a data center monitoring and management environment 200 to manage a particular data center asset 244. In certain embodiments, a data center management task may include a data center deployment operation, a data center remediation operation, a data center remediation documentation operation, a connectivity management operation, or a combination thereof.

As used herein, a data center deployment operation broadly refers to any function, task, procedure, or process performed, directly or indirectly, within a data center monitoring and management environment 200 to install a software file, such as a configuration file, a new software application, a version of an operating system, and so forth, on a data center asset 244. As likewise used herein, a data center remediation operation broadly refers to any function, task, procedure, or process performed, directly or indirectly, within a data center monitoring and management environment 200 to correct an operational situation associated with a component of a data monitoring and management environment 200, which if not corrected, may result in negative consequences. A data center remediation documentation operation, as likewise used herein, broadly refers to any function, task, procedure, or process performed, directly or indirectly, within a data center monitoring and management environment 200 to retrieve, generate, revise, update, or store remediation documentation that may be used in the performance of a data center remediation operation.

Likewise, as used herein, a connectivity management operation (also referred to as a data center connectivity management operation) broadly refers to any task, function, procedure, or process performed, directly or indirectly, to manage connectivity between a particular data center asset 244 and a particular data center monitoring and management console 118. In various embodiments, one or more connectivity management operations may be performed to ensure that data exchanged between a particular data center asset 244 and a particular data center monitoring and management console 118 during a communication session is secured. In certain of these embodiments, as described in greater detail herein, various cryptographic approaches familiar to skilled practitioners of the art may be used to secure a particular communication session.

In certain embodiments, the data center monitoring and management console 118 may be implemented to receive an alert corresponding to a particular data center issue. In various embodiments, the data center monitoring and management console 118 may be implemented to receive certain data associated with the operation of a particular data center asset 244. In certain embodiments, such operational data may be received through the use of telemetry approaches familiar to those of skill in the art. In various embodiments, the data center monitoring console 118 may be implemented to process certain operational data received from a particular data center asset to determine whether a data center issue has occurred, is occurring, or is anticipated to occur.

In certain embodiments, the data center monitoring and management console 118 may be implemented to include a monitoring module 120, a management monitor 122, an analysis engine 124, and a connectivity management system (CMS) 126, and an extensible data forwarding system 130, or a combination thereof. In certain embodiments, the monitoring module 120 may be implemented to monitor the procurement, deployment, implementation, operation, management, maintenance, or remediation of a particular data center asset 244 at any point in its lifecycle. In certain embodiments, the management module 122 may be implemented to manage the procurement, deployment, implementation, operation, monitoring, maintenance, or remediation of a particular data center asset 244 at any point in its lifecycle.

In various embodiments, the monitoring module 120, the management module 122, the analysis engine 124, and the CMS 126, and the extensible data forwarding system 130, may be implemented, individually or in combination with one another, to perform a data center asset monitoring and management operation, as likewise described in greater detail herein. In various embodiments, a CMS client 136 may be implemented on certain user devices 204, or certain data center assets 244, or a combination thereof. In various embodiments, the CMS 126 may be implemented in combination with a particular CMS client 136 to perform a connectivity management operation, as described in greater detail herein. In certain of these embodiments, the CMS 126 may likewise be implemented with the extensible data forwarding system 130 to perform the connectivity management operation.

In certain embodiments, the data center monitoring and management environment 200 may include a repository of data center monitoring and management data 220. In certain embodiments, the repository of data center monitoring and management data 220 may be local to the information handling system 100 executing the data center monitoring and management console 118 or may be located remotely. In various embodiments, the repository of data center monitoring and management data 220 may include certain information associated with data center asset data 220, data center asset configuration rules 224, data center infrastructure data 226, data center remediation data 228, and data center personnel data 230.

As used herein, data center asset data 222 broadly refers to information associated with a particular data center asset 244, such as an information handling system 100, or an associated workload, that can be read, measured, and structured into a usable format. For example, data center asset data 222 associated with a particular server may include the number and type of processors it can support, their speed and architecture, minimum and maximum amounts of memory supported, various storage configurations, the number, type, and speed of input/output channels and ports, and so forth. In various embodiments, the data center asset data 222 may likewise include certain performance and configuration information associated with a particular workload, as described in greater detail herein. In various embodiments, the data center asset data 222 may include certain public or proprietary information related to data center asset 244 configurations associated with a particular workload.

In certain embodiments, the data center asset data 222 may include information associated with data center asset 244 types, quantities, locations, use types, optimization types, workloads, performance, support information, and cost factors, or a combination thereof, as described in greater detail herein. In certain embodiments, the data center asset data 222 may include information associated with data center asset 244 utilization patterns, likewise described in greater detail herein. In certain embodiments, the data center asset data 222 may include information associated with the allocation of certain data center asset resources, described in greater detail herein, to a particular workload.

As likewise used herein, a data center asset configuration rule 224 broadly refers to a rule used to configure a particular data center asset 244. In certain embodiments, one or more data center asset configuration rules 224 may be used to verify that a particular data center asset 244 configuration is the most optimal for an associated location, or workload, or to interact with other data center assets 244, or a combination thereof, as described in greater detail herein. In certain embodiments, the data center asset configuration rule 224 may be used in the performance of a data center asset configuration verification operation, a data center remediation operation, or a combination of the two. In certain embodiments, the data center asset configuration verification operation, or the data center remediation operation, or both, may be performed by an asset configuration system 250. In certain embodiments, the asset configuration system 250 may be used in combination with the data center monitoring and management console 118 to perform a data center asset configuration operation, or a data center remediation operation, or a combination of the two.

As used herein, data center infrastructure 226 data broadly refers to any data associated with a data center infrastructure component. As likewise used herein, a data center infrastructure component broadly refers to any component of a data center monitoring and management environment 200 that may be involved, directly or indirectly, in the procurement, deployment, implementation, configuration, operation, monitoring, management, maintenance, or remediation of a particular data center asset 244. In certain embodiments, data center infrastructure components may include physical structures, such as buildings, equipment racks and enclosures, network and electrical cabling, heating, cooling, and ventilation (HVAC) equipment and associated ductwork, electrical transformers and power conditioning systems, water pumps and piping systems, smoke and fire suppression systems, physical security systems and associated peripherals, and so forth. In various embodiments, data center infrastructure components may likewise include the provision of certain services, such as network connectivity, conditioned airflow, electrical power, and water, or a combination thereof.

Data center remediation data 228, as used herein, broadly refers to any data associated with the performance of a data center remediation operation, described in greater details herein. In certain embodiments, the data center remediation data 228 may include information associated with the remediation of a particular data center issue, such as the date and time an alert was received indicating the occurrence of the data center issue. In certain embodiments, the data center remediation data 228 may likewise include the amount of elapsed time before a corresponding data center remediation operation was begun after receiving the alert, and the amount of elapsed time before it was completed. In various embodiments, the data center remediation data 228 may include information related to certain data center issues, the frequency of their occurrence, their respective causes, error codes associated with such data center issues, the respective location of each data center asset 244 associated with such data center issues, and so forth.

In various embodiments, the data center remediation data 228 may include information associated with data center asset 244 replacement parts, or upgrades, or certain third party services that may need to be procured in order to perform the data center remediation operation. Likewise, in certain embodiments, related data center remediation data 228 may include the amount of elapsed time before the replacement parts, or data center asset 244 upgrades, or third party services were received and implemented. In certain embodiments, the data center remediation data 228 may include information associated with data center personnel who may have performed a particular data center remediation operation. Likewise, in certain embodiments, related data center remediation data 228 may include the amount of time the data center personnel actually spent performing the operation, issues encountered in performing the operation, and the eventual outcome of the operation that was performed.

In certain embodiments, the data center remediation data 228 may include remediation documentation associated with performing a data center asset remediation operation associated with a particular data center asset 244. In various embodiments, such remediation documentation may include information associated with certain attributes, features, characteristics, functional capabilities, operational parameters, and so forth, of a particular data center asset 244. In certain embodiments, such remediation documentation may likewise include information, such as step-by-step procedures and associated instructions, video tutorials, diagnostic routines and tests, checklists, and so forth, associated with remediating a particular data center issue.

In certain embodiments, the data center remediation data 228 may include information associated with any related remediation dependencies, such as other data center remediation operations that may need to be performed beforehand. In certain embodiments, the data center remediation data 228 may include certain time restrictions when a data center remediation operation, such as rebooting a particular server, may be performed. In various embodiments, the data center remediation data 228 may likewise include certain autonomous remediation rules, described in greater detail herein. In various embodiments, certain of these autonomous remediation rules may be used in the performance of an autonomous remediation operation, described in greater detail herein. Those of skill in the art will recognize that many such examples of data center remediation data 228 are possible. Accordingly, the foregoing is not intended to limit the spirit, scope, or intent of the invention.

Data center personnel data 230, as used herein, broadly refers to any data associated with data center personnel who may be directly, or indirectly, involved in the procurement, deployment, configuration, implementation, operation, monitoring, management, maintenance, or remediation of a particular data center asset 244. In various embodiments, the data center personnel data 230 may include job title, work assignment, or responsibility information corresponding to certain data center personnel. In various embodiments, the data center personnel data 230 may include information related to the type, and number, of data center remediation operations currently being, or previously, performed by certain data center personnel. In various embodiments, the data center personnel data 230 may include historical information, such as success metrics, associated with data center remediation operations performed by certain data center personnel, such as data center administrators, operators, and technicians. In these embodiments, the data center personnel data 230 may be updated as individual data center personnel complete each data center remediation task, described in greater detail herein, they are assigned.

In various embodiments, the data center personnel data 230 may likewise include education, certification, and skill level information corresponding to certain data center personnel. Likewise, in various embodiments, the data center personnel data 230 may include security-related information, such as security clearances, user IDs, passwords, security-related biometrics, authorizations, and so forth, corresponding to certain data center personnel. Those of skill in the art will recognize that many such examples of data center personnel data 230 are possible. Accordingly, the foregoing is not intended to limit the spirit, scope, or intent of the invention.

In certain embodiments, various data center assets 244 within a data center monitoring and management environment 200 may have certain interdependencies. As an example, a data center monitoring and management environment 200 may have multiple servers interconnected by a storage area network (SAN) providing block-level access to various disk arrays and tape libraries. In this example, the servers, various physical and operational elements of the SAN, as well the disk arrays and tape libraries, are interdependent upon one another.

In certain embodiments, each data center asset 244 in a data center monitoring and management environment 200 may be treated as a separate data center asset 244 and depreciated individually according to their respective attributes. As an example, a particular rack of servers in a data center monitoring and management environment 200 may be made up of a variety of individual servers, each of which may have a different depreciation schedule. To continue the example, certain of these data center assets 244 may be implemented in different combinations to produce an end result. To further illustrate the example, a particular server in the rack of servers may initially be implemented to query a database of customer records. As another example, the same server may be implemented at later time perform an analysis of sales associated with those same customer records.

In certain embodiments, each data center asset 244 in a data center monitoring and management environment 200 may have an associated maintenance schedule and service contract. For example, a data center monitoring and management environment 200 may include a wide variety of servers and storage arrays, which may respectively be manufactured by a variety of manufacturers. In this example, the frequency and nature of scheduled maintenance, as well as service contract terms and conditions, may be different for each server and storage array. In certain embodiments, the individual data center assets 244 in a data center monitoring and management environment 200 may be configured differently, according to their intended use. To continue the previous example, various servers may be configured with faster or additional processors for one intended workload, while other servers may be configured with additional memory for other intended workloads. Likewise, certain storage arrays may be configured as one RAID configuration, while others may be configured as a different RAID configuration.

In certain embodiments, the data center monitoring and management environment 200 may likewise be implemented to include an asset configuration system 250, a product configuration system 252, a product fabrication system 254, and a supply chain system 256, or a combination thereof. In various embodiments, the asset configuration system 250 may be implemented to perform certain data center asset 244 configuration operations. In certain embodiments, the data center asset 244 configuration operation may be performed to configure a particular data center asset 244 for a particular purpose. In certain embodiments, the data center monitoring and management console 118 may be implemented to interact with the asset configuration system 250 to perform a particular data center asset 244 configuration operation. In various embodiments, the asset configuration system 250 may be implemented to generate, manage, and provide, or some combination thereof, data center asset configuration rules 224. In certain of these embodiments, the data center asset configuration rules 224 may be used to configure a particular data center asset 244 for a particular purpose.

In certain embodiments, a user 202 may use a user device 204 to interact with the data center monitoring and management console 118. As used herein, a user device 204 refers to an information handling system such as a personal computer, a laptop computer, a tablet computer, a personal digital assistant (PDA), a smart phone, a mobile telephone, or other device that is capable of processing and communicating data. In certain embodiments, the communication of the data may take place in real-time or near-real-time. As used herein, real-time broadly refers to processing and providing information within a time interval brief enough to not be discernable by a user 202.

In certain embodiments, a user device 204 may be implemented with a camera 206, such as a video camera known to skilled practitioners of the art. In certain embodiments, the camera 206 may be integrated into the user device 204. In certain embodiments, the camera 206 may be implemented as a separate device configured to interoperate with the user device 204. As an example, a webcam familiar to those of skill in the art may be implemented receive and communicate various image and audio signals to a user device 204 via a Universal Serial Bus (USB) interface. In certain embodiments, the user device 204 may be configured to present a data center monitoring and management console user interface (UI) 240. In certain embodiments, the data center monitoring and management console UI 240 may be implemented to present a graphical representation 242 of data center asset monitoring and management information, which is automatically generated in response to interaction with the data center monitoring and management console 118.

In certain embodiments, a data center monitoring and management application 238 may be implemented on a particular user device 204. In various embodiments, the data center monitoring and management application 238 may be implemented on a mobile user device 204, such as a laptop computer, a tablet computer, a smart phone, a dedicated-purpose mobile device, and so forth. In certain of these embodiments, the mobile user device 204 may be used at various locations within the data center monitoring and management environment 200 by the user 202 when performing a data center monitoring and management operation, described in greater detail herein.

In various embodiments, the data center monitoring and management application 238 may be implemented to facilitate a user 202, such as a data center administrator, operator, or technician, to perform a particular data center remediation operation. In various embodiments, such facilitation may include using the data center monitoring and management application 238 to receive a notification of a data center remediation task, described in greater detail herein, being assigned to the user. In certain embodiments, the data center monitoring and management console 118 may be implemented to generate the notification of the data center remediation task assignment, and assign it to the user, as likewise described in greater detail herein. In certain embodiments, the data center monitoring and management console 118 may be implemented to generate the data center remediation task, and once generated, provide it to the data center monitoring and management application 238 associated with the assigned user 202.

In certain embodiments, such facilitation may include using the data center monitoring and management application 238 to receive the data center remediation task from the data center monitoring and management console 118. In various embodiments, such facilitation may include using the data center monitoring and management application 238 to confirm that the user 202 is at the correct physical location of a particular data center asset 244 associated with a corresponding data center issue. In certain of these embodiments, the data center monitoring and management application 238 may be implemented to include certain Global Positioning System (GPS) capabilities, familiar to those of skill in the art, which may be used to determine the physical location of the user 202 in relation to the physical location of a particular data center asset 244.

In various embodiments, such facilitation may include using the data center monitoring and management application 238 to ensure the user 202 is aware of, or is provided the location of, or receives, or a combination thereof, certain remediation resources, described in greater detail herein, that may be needed to perform a particular data center remediation operation. In various embodiments, such facilitation may include using the data center monitoring and management application 238 to view certain remediation documentation, or augmented instructions, related to performing a particular data center remediation operation. In various embodiments, such facilitation may include using the data center monitoring and management application 238 to certify that a particular data center remediation operation has been performed successfully.

In certain embodiments the UI window 240 may be implemented as a UI window of the data center monitoring and management application 238. In various embodiments, the data center monitoring and management application 238 may be implemented to include, in part or in whole, certain functionalities associated with the data center monitoring and management console 118. In certain embodiments, the data center monitoring and management application 238 may be implemented to interact in combination with the data center monitoring and management console 118, and other components of the data center monitoring and management environment 200, to perform a data center monitoring and management operation.

In certain embodiments, the user device 204 may be used to exchange information between the user 202 and the data center monitoring and management console 118, the data center monitoring and management application 238, the asset configuration system 250, the product configuration system 252, the product fabrication system 254, and the supply chain system 256, or a combination thereof, through the use of a network 140. In various embodiments, the asset configuration system 250 may be implemented to configure a particular data center asset 244 to meet certain performance goals. In various embodiments, the asset configuration system 250 may be implemented to use certain data center monitoring and management data 220, certain data center asset configuration rules 226 it may generate or manage, or a combination thereof, to perform such configurations.

In various embodiments, the product configuration system 252 may be implemented to use certain data center monitoring and management data 220 to optimally configure a particular data center asset 244, such as a server, for an intended workload. In various embodiments, the data center monitoring and management data 220 used by the product configuration system 252 may have been generated as a result of certain data center monitoring and management operations, described in greater detail herein, being performed by the data center monitoring and management console 118. In various embodiments, the product configuration system 252 may be implemented to provide certain product configuration information to a product fabrication system 254. In various embodiments, the product fabrication system 254 may be implemented to provide certain product fabrication information to a product fabrication environment (not shown). In certain embodiments, the product fabrication information may be used by the product fabrication environment to fabricate a product, such as a server, to match a particular data center asset 244 configuration.

In various embodiments, the data center monitoring and management console UI 240 may be presented via a website (not shown). In certain embodiments, the website may be provided by one or more of the data center monitoring and management console 118, the asset configuration system 250, the product configuration system 252, the product fabrication system 254, or the supply chain system 256. In certain embodiments, the supply chain system 256 may be implemented to manage the provision, fulfillment, or deployment of a particular data center asset 244 produced in the product fabrication environment. For the purposes of this disclosure a website may be defined as a collection of related web pages which are identified with a common domain name and is published on at least one web server. A website may be accessible via a public IP network or a private local network.

A web page is a document which is accessible via a browser which displays the web page via a display device of an information handling system. In various embodiments, the web page also includes the file which causes the document to be presented via the browser. In various embodiments, the web page may comprise a static web page, which is delivered exactly as stored and a dynamic web page, which is generated by a web application that is driven by software that enhances the web page via user input 208 to a web server.

In certain embodiments, the data center monitoring and management console 118 may be implemented to interact with the asset configuration system 250, the product configuration system 252, the product fabrication system 254, and the supply chain or fulfillment system 256, or a combination thereof, each of which in turn may be executing on a separate information handling system 100. In certain embodiments, the data center monitoring and management console 118 may be implemented to interact with the asset configuration system 250, the product configuration system 252, the product fabrication system 254, and the supply chain or fulfillment system 256, or a combination thereof, to perform a data center monitoring and management operation, as described in greater detail herein.

Figure 3:
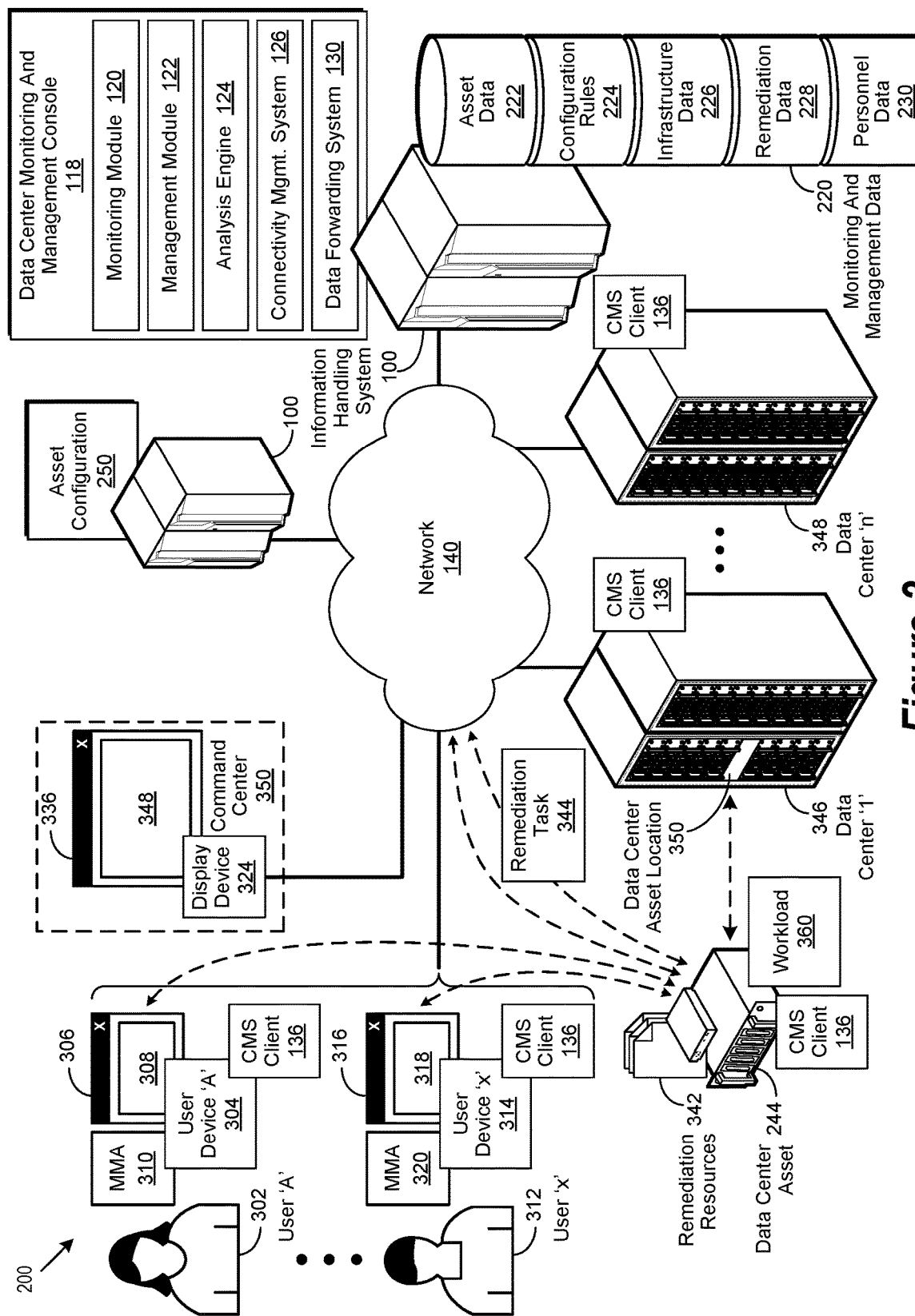
FIG. 3 shows a functional block diagram of the performance of certain data center monitoring and management operations.

FIG. 3 shows a functional block diagram of the performance of certain data center monitoring and management operations implemented in accordance with an embodiment of the invention. In various embodiments, a data center monitoring and management environment 200, described in greater detail herein, may be implemented to include one or more data centers, such as data centers '1' 346 through 'n' 348. As likewise described in greater detail herein, each of the data centers '1' 346 through 'n' 348 may be implemented to include one or more data center assets 244, likewise described in greater detail herein.

In certain embodiments, a data center asset 244 may be implemented to process an associated workload 360. A workload 360, as used herein, broadly refers to a measure of information processing that can be performed by one or more data center assets 244, individually or in combination with one another, within a data center monitoring and management environment 200. In certain embodiments, a workload 360 may be implemented to be processed in a virtual machine (VM) environment, familiar to skilled practitioners of the art. In various embodiments, a workload 360 may be implemented to be processed as a containerized workload 360, likewise familiar to those of skill in the art.

In certain embodiments, as described in greater detail herein, the data center monitoring and management environment 200 may be implemented to include a data center monitoring and management console 118. In certain embodiments, the data center monitoring and management console 118 may be implemented to include a monitoring module 120, a management module 122, an analysis engine 124, and a connectivity management system (CMS) 126, and a extensible data forwarding system 130, or a combination thereof, as described in greater detail herein. In various embodiments, a CMS client 136, described in greater detail herein may be implemented on certain user devices 'A' 304 through 'x' 314, or certain data center assets 244, or within data centers '1' 346 through 'n' 348, or a combination thereof. In certain embodiments, the CMS 126 may be implemented in combination with a particular CMS client 136 to perform a connectivity management operation, as likewise described in greater detail herein.

As described in greater detail herein, the data center monitoring and management console 118 may be implemented in certain embodiments to perform a data center monitoring and management operation. In certain embodiments, the data center monitoring and management console 118 may be implemented to provide a unified framework for the performance of a plurality of data center monitoring and management operations, by a plurality of users, within a common user interface (UI). In certain embodiments, the data center monitoring and management console 118, and other components of the data center monitoring environment 200, such as the asset configuration system 250, may be implemented to be used by a plurality of users, such as users 'A' 302 through 'x' 312 shown in FIG. 3. In various embodiments, certain data center personnel, such as users 'A' 302 through 'x' 312, may respectively interact with the data center monitoring and management console 118, and other components of the data center monitoring and management environment 200, through the use of an associated user device 'A' 304 through 'x' 314.

In certain embodiments, such interactions may be respectively presented to users 'A' 302 through 'x' 312 within a user interface (UI) window 306 through 316, corresponding to user devices 'A' 304 through 'x' 314. In certain embodiments the UI window 306 through 316 may be implemented in a window of a web browser, familiar to skilled practitioners of the art. In certain embodiments, a data center monitoring and management application (MMA) 310 through 320, described in greater detail herein, may be respectively implemented on user devices 'A' 304 through 'x' 314. In certain embodiments the UI window 306 through 316 may be respectively implemented as a UI window of the data center MMA 310 through 320. In certain embodiments, the data center MMA 310 through 320 may be implemented to interact in combination with the data center monitoring and management console 118, and other components of the data center monitoring and management environment 200, to perform a data center monitoring and management operation.

In certain embodiments, the interactions with the data center monitoring and management console 118, and other components of the data center monitoring and management environment 200, may respectively be presented as a graphical representation 308 through 318 within UI windows 306 through 316. In various embodiments, such interactions may be presented to users 'A' 302 through 'x' 312 via a display device 324, such as a projector or large display screen. In certain of these embodiments, the interactions may be presented to users 'A' 302 through 'x' 312 as a graphical representation 348 within a UI window 336.

In certain embodiments, the display device 324 may be implemented in a command center 350, familiar to those of skill in the art, such as a command center 350 typically found in a data center or a network operations center (NOC). In various embodiments, one or more of the users 'A' 302 through 'x' 312 may be located within the command center 350. In certain of these embodiments, the display device 324 may be implemented to be generally viewable by one or more of the users 'A' 302 through 'x' 312.

In certain embodiments, the data center monitoring and management operation may be performed to identify the location 350 of a particular data center asset 244. In certain embodiments, the location 350 of a data center asset 244 may be physical, such as the physical address of its associated data center, a particular room in a building at the physical address, a particular location in an equipment rack in that room, and so forth. In certain embodiments, the location 350 of a data center asset 244 may be non-physical, such as a network address, a domain, a Uniform Resource Locator (URL), a file name in a directory, and so forth.

Certain embodiments of the invention reflect an appreciation that it is not uncommon for large organization to have one or more data centers, such as data centers '1' 346 through 'n' 348. Certain embodiments of the invention reflect an appreciation that it is likewise not uncommon for such data centers to have multiple data center system administrators and data center technicians. Likewise, various embodiments of the invention reflect an appreciation that it is common for a data center system administrator to be responsible for planning, initiating, and overseeing the execution of certain data center monitoring and management operations. Certain embodiments of the invention reflect an appreciation that it is common for a data center system administrator, such as user 'A' 302, to assign a particular data center monitoring and management operation to a data center technician, such as user 'x' 312, as a task to be executed.

Certain embodiments of the invention reflect an appreciation that it is likewise common for a data center administrator, such as user 'A' 302, to assume responsibility for performing a particular data center monitoring and management operation. As an example, a data center administrator may receive a stream of data center alerts, each of which is respectively associated with one or more data center issues. To continue the example, several of the alerts may have an initial priority classification of "critical." However, the administrator may notice that one such alert may be associated with a data center issue that is more critical, or time sensitive, than the others and should be remediated as quickly as possible. Accordingly, the data center administrator may elect to assume responsibility for remediating the data center issue, and as a result, proceed to perform an associated data center remediation operation at that time instead of assigning it to other data center personnel.

Certain embodiments of the invention reflect an appreciation that the number of data center assets 244 in a particular data center '1' 346 through 'n' 348 may be quite large. Furthermore, it is not unusual for such data center assets 244 to be procured, deployed, configured, and implemented on a scheduled, or as needed, basis. It is likewise common for certain existing data center assets 244 to be replaced, upgraded, reconfigured, maintained, or remediated on a scheduled, or as-needed, basis. Likewise, certain embodiments of the invention reflect an appreciation that such replacements, upgrades, reconfigurations, maintenance, or remediation may be oriented towards hardware, firmware, software, connectivity, or a combination thereof.

For example, a data center system administrator may be responsible for the creation of data center asset 244 procurement, deployment, configuration, and implementation templates, firmware update bundles, operating system (OS) and software application stacks, and so forth. Likewise, a data center technician may be responsible for receiving a procured data center asset 244, transporting it to a particular data asset location 350 in a particular data center '1' 346 through 'n' 348, and implementing it in that location 350. The same, or another, data center technician may then be responsible for configuring the data center asset 244, establishing network connectivity, applying configuration files, and so forth. To continue the example, the same, or another, data center administrator or technician may be responsible for remediating hardware issues, such as replacing a disc drive in a server or Redundant Array of Independent Disks (RAID) array, or software issues, such as updating a hardware driver or the version of a server's operating system. Accordingly, certain embodiments of the invention reflect an appreciation that a significant amount of coordination may be needed between data center system administrators and data center technicians to assure efficient and reliable operation of a data center.

In various embodiments, certain data center monitoring and management operations may include a data center remediation operation, described in greater detail herein. In certain embodiments, a data center remediation operation may be performed to remediate a particular data asset 244 issue at a particular data asset location 350 in a particular data center '1' 346 through 'n' 348. In certain embodiments, the data center remediation operation may be performed to ensure that a particular data center asset location 350 in a particular data center '1' 346 through 'n' 348 is available for the replacement or upgrade of an existing data center asset 244. As an example, a data center remediation operation may involve deployment of a replacement server that occupies more rack space than the server it will be replacing.

In various embodiments, the data center monitoring and management console 118, or the data center monitoring and management application 310 through 320, or a combination of the two, may be implemented in a failure tracking mode to capture certain data center asset 244 telemetry. In various embodiments, the data center asset 244 telemetry may include data associated with the occurrence of certain events, such as the failure, or anomalous performance, of a particular data center asset 244, or an associated workload 360, in whole, or in part. In certain embodiments, the data center asset 244 telemetry may be captured incrementally to provide a historical perspective of the occurrence, and evolution, of an associated data center issue.

In various embodiments, the data center monitoring and management console 118 may likewise be implemented generate certain remediation operation notes. For example, the data center monitoring and management console 118 may enter certain data center asset 244 remediation instructions in the data center remediation operation notes. In various embodiments, the data center remediation operation notes may be implemented to contain information related to data center asset 244 replacement or upgrade parts, data center asset 244 files that may be needed, installation and configuration instructions related to such files, the physical location 350 of the data center asset 244, and so forth. In certain embodiments, a remediation task 344 may be generated by associating the previously-generated data center remediation operation notes with the remediation documentation, data center asset files, or other remediation resources 342 most pertinent to the data center issue, and the administrator, and any data center personnel selected or its remediation. As used herein, a data center remediation task 344 broadly refers to one or more data center remediation operations, described in greater detail herein, that can be assigned to one or more users 'A' 302 through 'x' 312.

Certain embodiments of the invention reflect an appreciation that a group of data center personnel, such as users 'A' 302 through 'x' 312, will likely possess different skills, certifications, levels of education, knowledge, experience, and so forth. As a result, remediation documentation that is suitable for certain data center personnel may not be suitable for others. For example, a relatively inexperienced data center administrator may be overwhelmed by a massive volume of detailed and somewhat arcane minutiae related to the configuration and administration of multiple virtual machines (VMs) on a large server. However, such remediation documentation may be exactly what a highly skilled and experienced data center administrator needs to remediate subtle server and VM configuration issues.

Conversely, the same highly skilled and experienced data center administrator may be hampered, or slowed down, by being provided remediation documentation that is too simplistic, generalized, or high-level for the data center issue they may be attempting to remediate. Likewise, an administrator who is moderately skilled in configuring VMs may benefit from having step-by-step instructions, and corresponding checklists, when remediating a VM-related data center issue. Accordingly, as used herein, pertinent remediation documentation broadly refers to remediation documentation applicable to a corresponding data center issue that is most suited to the skills, certifications, level of education, knowledge, experience, and so forth of the data center personnel assigned to its remediation.

In various embodiments, the data center monitoring and management console 118 may be implemented to generate a corresponding notification of the remediation task 344. In certain embodiments, the resulting notification of the remediation task 344 assignment may be provided to the one or more users 'A' 302 through 'x' 312 assigned to perform the remediation task 344. In certain embodiments, the notification of the remediation task 344 assignment may be respectively provided to the one or more users 'A' 302 through 'x' 312 within the UI 306 through 316 of their respective user devices 'A' 304 through 'x' 314. In certain embodiments, the notification of the remediation task 344 assignment, and the remediation task 344 itself, may be implemented such that they are only visible to the users 'A' 302 through 'x' 312 to which it is assigned.

In certain embodiments, the data center monitoring and management console 118 may be implemented to operate in a monitoring mode. As used herein, monitoring mode broadly refers to a mode of operation where certain monitoring information provided by the monitoring and management console 118 is available for use by one or more users 'A' 302 through 'x' 312. In certain embodiments, one or more of the users 'A' 302 through 'x' 312 may be command center 350 users. In certain embodiments, the data center monitoring and management console 118 may be implemented to operate in a management mode. As used herein, management mode broadly refers to a mode of operation where certain operational functionality of the data center monitoring and management console 118 is available for use by a user, such as users 'A' 302 through 'x' 312.

Figure 4:
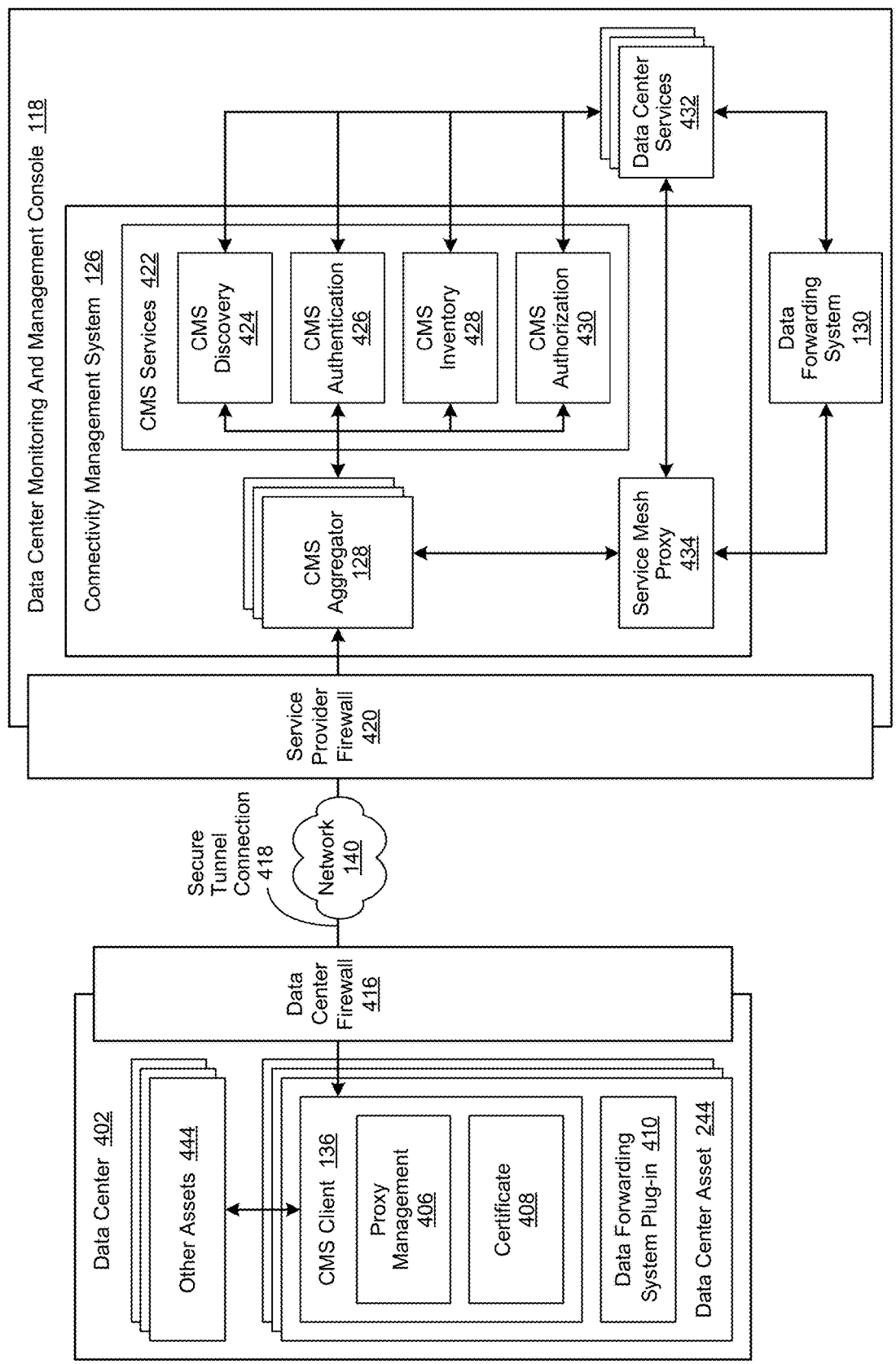
FIG. 4 shows a block diagram of a connectivity management system (CMS)

FIG. 4 shows a block diagram of a connectivity management system implemented in accordance with an embodiment of the invention. In various embodiments, a data center monitoring and management console 118, described in greater detail herein, may be implemented to include a connectivity management system (CMS) 126, a extensible data forwarding system 130, and one or more data center services 432, or a combination thereof. In various embodiments, the CMS 126 may be implemented individually, or in combination with a particular CMS client 136, to perform a connectivity management operation, likewise described in greater detail herein. In various embodiments, one or more connectivity management operations may be performed to initiate, and manage, secure, bi-directional, real-time connectivity between a data center monitoring and management console 118 and a particular data center asset 244, each of which are likewise described in greater detail herein.

In various embodiments, the extensible data forwarding system 130 may be implemented to perform an extensible data forwarding operation. As used herein, an extensible data forwarding operation broadly refers to any task, function, procedure, operation, or process performed, directly or indirectly, within a data center monitoring and management environment, described in greater detail herein, to use data forwarding approaches to interact with a data center monitoring and management console 118, or one or more data center assets 244, or a combination thereof, to forward particular data regarding one or more data center assets 224 to one or more recipients. In various embodiments, a particular data center monitoring and management operation may include the performance of one or more extensible data forwarding operations. In certain of these embodiments, the extensible data forwarding system 130 may be implemented, individually or in combination with a particular extensible data forwarding system plug-in 410, to perform such an extensible data forwarding operation.

In certain embodiments, the CMS 126, the CMS client 136, the extensible data forwarding system 130, and the extensible data forwarding system plug-in 410, or a combination thereof, may likewise be implemented to perform a particular extensible data forwarding operation, a particular connectivity management operation, or a particular data center monitoring and management operation, or a combination thereof. In various embodiments, the data center monitoring and management console 118 may be implemented on the premises of a data center owner or operator. In various embodiments, the data center monitoring and management console 118 may be implemented in a cloud environment familiar to skilled practitioners of the art.

In certain of these embodiments, the operator of the data center monitoring and management console 118 may offer its various functionalities and capabilities in the form of one or more or more cloud-based data center services 432, described in greater detail herein, for either private or public use, or both. In various embodiments, one or more data center assets 244 may be implemented within a data center 402, likewise described in greater detail herein. In certain of these embodiments, the data center 402 may reside on the premises of a user of one or more data center services 432 provided by the operator of the data center monitoring and management console 118.

In various embodiments, the connectivity management system 126 may be implemented to include one or more CMS aggregators 128, one or more CMS services 422, and a service mesh proxy 434, or a combination thereof. In various embodiments, the CMS aggregator 128 may be implemented to interact with one or more of the CMS services 422, as described in greater detail herein. In various embodiments, the data center services 432 may likewise be implemented to interact with one or more of the CMS services 422, and the service mesh proxy 434, or a combination thereof. In certain embodiments, the CMS services 422 may be implemented to include a CMS discovery 424 service, a CMS authentication 426 service, a CMS inventory 428 service, and a CMS authorization 430 service, or a combination thereof.

In various embodiments, one or more data center assets 244 may be implemented within a data center 402, described in greater detail herein. In certain embodiments, the data center 402 may be implemented to include an associated data center firewall 416. In certain embodiments, a CMS client 136, or an extensible data forwarding system plug-in module 410, or both, may be implemented on one or more data center assets 244.

In various embodiments, a CMS client 136 or an extensible data forwarding system plug-in module 410, or both, implemented on one data center asset 244 may likewise be implemented to enable one or more connectivity management operations, or one or more extensible data forwarding operations, or a combination thereof, associated with one or more other data center assets 444 that are not respectively implemented with their own CMS client 136 or extensible data forwarding system plug-in module 410. In certain of these embodiments, the CMS client 136, or the extensible data forwarding system plug-in module 410, or both, may be implemented to assume the identity, and attributes, of a particular data center asset 244 it is directly, or indirectly, associated with.

In various embodiments, the CMS client 136 may be implemented with a proxy management module 406. In certain of these embodiments, the proxy management module 406 may be implemented to manage the CMS client's 136 connectivity to an external network 140 through an intermediary proxy server, or the data center firewall 416, or both. Those of skill in the art will be familiar with a proxy server, which as typically implemented, is a server application that acts as an intermediary between a client, such as a web browser, requesting a resource, such as a web page, from a provider of that resource, such as a web server.

In certain embodiments, the client of a proxy server may be a particular data center asset 244 requesting a resource, such as a particular data center service 432, from the data center monitoring and management console 118. Skilled practitioners of the art will likewise be aware that in typical proxy server implementations, a client may direct a request to a proxy server, which evaluates the request and performs the network transactions needed to forward the request to a designated resource provider. Accordingly, the proxy server functions as a relay between the client and a server, and as such acts as an intermediary.

Those of skill in the art will be aware that proxy servers also assist in preventing an attacker from invading a private network, such as one implemented within a data center 402 to provide network connectivity to, and between, certain data center assets 244. Skilled practitioners of the art will likewise be aware that server proxies are often implemented in combination with a firewall, such as the data center firewall 416. In such implementations, the proxy server, due to it acting as an intermediary, effectively hides an internal network from the Internet, while the firewall prevents unauthorized access by blocking certain ports and programs.

Accordingly, a firewall may be configured to allow traffic emanating from a proxy server to pass through to an external network 140, while blocking all other traffic from an internal network. Conversely, a firewall may likewise be configured to allow network 140 traffic emanating from a trusted source to pass through to an internal network, while blocking traffic from unknown or untrusted external sources. As an example, the data center firewall 416 may be configured in various embodiments to allow traffic emanating from the CMS client 136 to pass, while the service provider firewall 420 may be configured to allow traffic emanating from the CMS aggregator 128 to pass. Likewise, the service provider firewall 420 may be configured in various embodiments to allow incoming traffic emanating from the CMS client 136 to be received, while the data center firewall 416 may be configured to allow incoming network traffic emanating from the CMS aggregator 128 to be received.

In various embodiments, a particular CMS aggregator 128 may be implemented in combination with a particular CMS client 136 to provide a split proxy that allows an associated data center asset 244 to securely communicate with a data center monitoring and management console 118. In various embodiments, the split proxy may be implemented in a client/server configuration. In certain of these embodiments, the CMS client 136 may be implemented as the client component of the client/server configuration and the CMS aggregator 128 may be implemented as the server component. In certain of these embodiments, one or more connectivity management operations may be respectively performed by the CMS aggregator 128 and the CMS client 136 to establish a secure tunnel connection 418 through a particular network 140, such as the Internet.

In various embodiments, the secure tunnel connection 418 may be initiated by the CMS client 136 first determining the address of the CMS aggregator 128 it intends to connect to. In these embodiments, the method by which the address of the CMS aggregator 128 is determined is a matter of design choice. Once the address of the CMS aggregator 128 is determined, the CMS client 136 uses it to establish a secure Hypertext Transport Protocol (HTTPS) connection with the CMS aggregator 128 itself.

In response, the CMS aggregator 128 sets its HTTPS Transport Layer Security (TLS) configuration to "request TLS certificate" from the CMS client 136, which triggers the CMS client 136 to provide its requested TLS certificate 408. In certain embodiments, the CMS authentication 426 service may be implemented to generate and provision the TLS certificate 408 for the CMS client 136. In certain embodiments, the CMS client 136 may be implemented to generate a self-signed TLS certificate if it has not yet been provisioned with one from the CMS authentication 426 service.

In various embodiments, the CMS client 136 may then provide an HTTP header with a previously-provisioned authorization token. In certain embodiments, the authorization token may have been generated and provisioned by the CMS authentication 426 service once the CMS client has been claimed. As used herein, a claimed CMS client 136 broadly refers to a particular CMS client 136 that has been bound to an account associated with a user, such as a customer, of one or more data center services 432 provided by the data center monitoring and management console 118.

In certain embodiments, a CMS client 136 may be implemented to maintain its claimed state by renewing its certificate 408 and being provided an associated claim token. In these embodiments, the frequency, or conditions under which, a CMS client's certificate 408 is renewed, or the method by which it is renewed, or both, is a matter of design choice. Likewise, in these same embodiments, the frequency, or conditions under which, an associated claim token is generated, or the method by which it is provided to a CMS client 136, or both, is a matter of design choice.

In various embodiments, the CMS client 136 may be implemented to have a stable, persistent, and unique identifier (ID) after it is claimed. In certain of these embodiments, the CMS client's 136 unique ID may be stored within the authorization token. In these embodiments, the method by the CMS client's 136 unique ID is determine, and the method by which it is stored within an associated authorization token, is a matter of design choice.

Once the CMS client 136 has been claimed, it may be implemented to convert the HTTPS connection to a Websocket connection, familiar to those of skill in the art. After the HTTP connection has been converted to a Websocket connection, tunnel packet processing is initiated and the CMS aggregator 128 may then perform a Representational State Transfer (REST) request the CMS client 136 to validate its certificate 408. In certain embodiments, the validation of the CMS client's 136 certificate 408 is performed by the CMS authorization 430 service.

In various embodiments, the validation of the CMS client's 136 certificate 408 is performed to determine a trust level for the CMS client 136. In certain of these embodiments, if the CMS client's 136 certificate 408 is validated, then it is assigned a "trusted" classification. Likewise, if CMS client's 136 certificate 408 fails to be validated, then it is assigned an "untrusted" classification.

Accordingly, certain embodiments of the invention reflect an appreciation that "trusted" and "claimed," as used herein as they relate to a CMS client 136 are orthogonal. More specifically, "trust" means that the channel of communication can be guaranteed. Likewise, "claimed" the CMS client 136 can be authenticated and bound to a user, or customer, of one or more data center services 432 provided by the data center monitoring and management console 118.

In various embodiments, the resulting secure tunnel connection 418 may be implemented to provide a secure channel of communication through a data center firewall 416 associated with a particular data center 402 and a service provider firewall 420 associated with a particular data center monitoring and management console 118. In various embodiments, the CMS client 136, the secure tunnel connection 418, and the CMS aggregator 128 may be implemented to operate at the application level of the Open Systems Interconnection (OSI) model, familiar to those of skill in the art. Skilled practitioners of the art will likewise be aware that known approaches to network tunneling typically use the network layer of the OSI model. In certain embodiments, the CMS client 136 and the CMS aggregator 128 may be implemented to end logical events over the secure tunnel connection 418 to encapsulate and multiplex individual connection streams and associated metadata.

In various embodiments, the CMS discovery 424 service may be implemented to identify certain data center assets 244 to be registered and managed by the data center monitoring and management console 118. In various embodiments, the CMS discovery 424 service may be implemented to detect certain events published by a CMS aggregator 128. In certain embodiments, the CMS discovery 424 service may be implemented to maintain a database (not shown) of the respective attributes of all CMS aggregators 128 and CMS clients 136. In certain embodiments, the CMS discovery 424 service may be implemented to track the relationships between individual CMS clients 136 and the CMS aggregators 128 they may be connected to.

In various embodiments, the CMS discovery 424 service may be implemented to detect CMS client 136 connections and disconnections with a corresponding CMS aggregator 128. In certain of these embodiments, a record of such connections and disconnections is stored in a database (not shown) associated with the CMS inventory 428 service. In various embodiments, the CMS discovery 424 service may be implemented to detect CMS aggregator 128 start-up and shut-down events. In certain of these embodiments, a record of related Internet Protocol (IP) addresses and associated state information may is stored in a database (not shown) associated with the CMS inventory 428 service.

In various embodiments, the CMS authentication 426 service may be implemented to include certain certificate authority (CA) capabilities. In various embodiments, the CMS authentication 426 service may be implemented to generate a certificate 408 for an associated CMS client 136. In various embodiments, the CMS authentication 426 service may be implemented to use a third party CA for the generation of a digital certificate for a particular data center asset 244. In certain embodiments, the CMS inventory 428 service may be implemented to maintain an inventory of each CMS aggregator 128 by an associated unique ID. In certain embodiments, the CMS inventory 428 service may likewise be implemented to maintain an inventory of each CMS client 136 by an associated globally unique identifier (GUID).

In various embodiments, the CMS authorization 430 service may be implemented to authenticate a particular data center asset 244 by requesting certain proof of possession information, and then processing it once it is received. In certain of these embodiments, the proof of possession information may include information associated with whether or not a particular CMS client 136 possesses the private keys corresponding to an associated certificate 408. In various embodiments, the CMS authorization 430 service may be implemented to authenticate a particular CMS client 136 associated with a corresponding data center asset 244. In certain of these embodiments, the CMS authorization 430 service may be implemented to perform the authentication by examining a certificate 408 associated with the CMS client 136 to ensure that it has been signed by the CMS authentication 426 service.

In various embodiments, the service mesh proxy 434 may be implemented to integrate knowledge pertaining to individual data center assets 244 into a service mesh such that certain data center services 432 have a uniform method of transparently accessing them. In various embodiments, the service mesh proxy 434 may be implemented with certain protocols corresponding to certain data center assets 244. In certain embodiments, the service mesh proxy 434 may be implemented to encapsulate and multiplex individual connection streams and metadata over the secure tunnel connection 418. In certain embodiments, these individual connection streams and metadata may be associated with one or more data center assets 244, one or more data center services 432, one or more CMS clients 136, and one or more CMS aggregators 128, or a combination thereof.

Figure 5A:
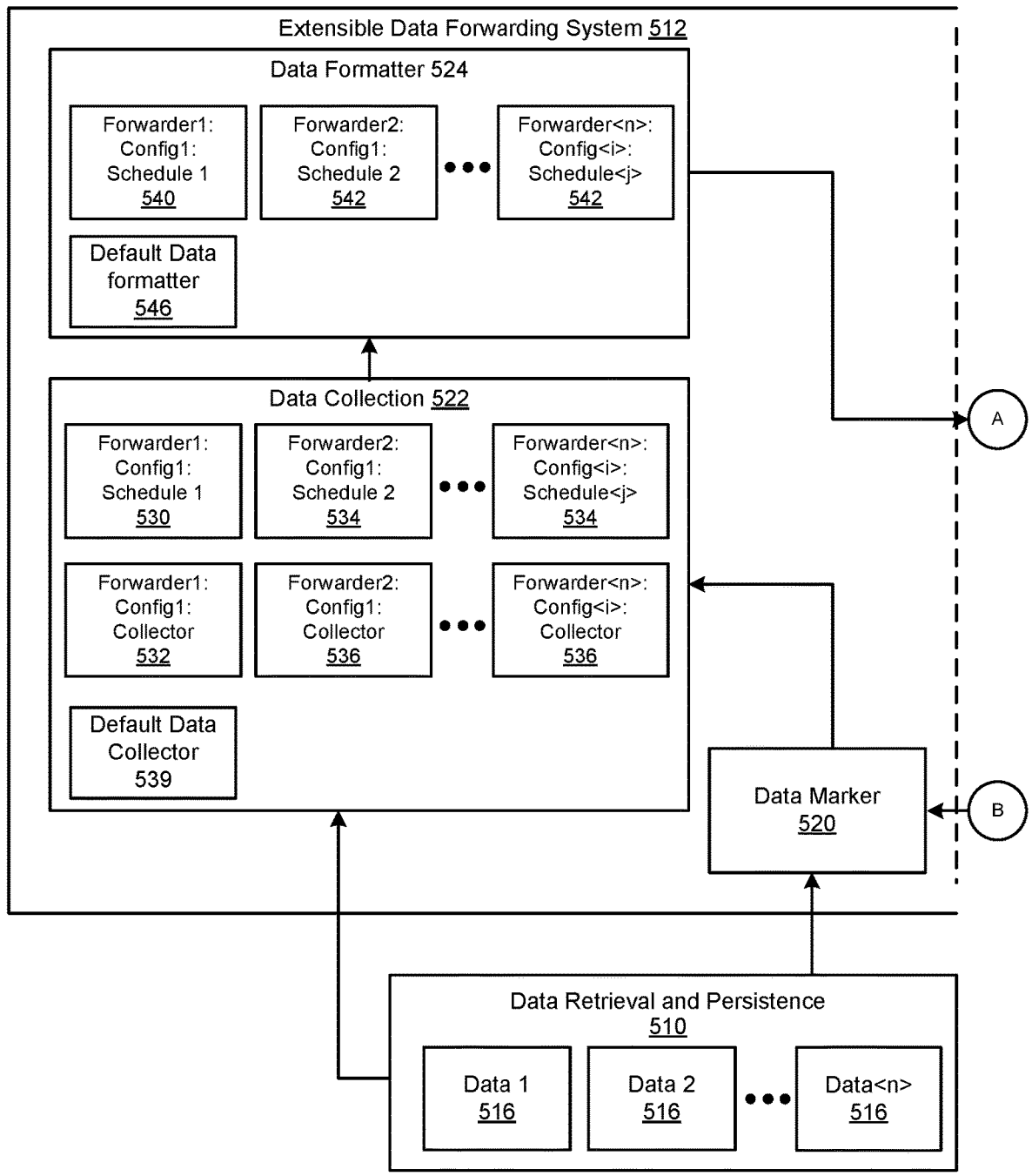
FIGS. 5A and 5B, generally referred to as FIG. 5, shows simplified block diagram of an extensible data forwarding environment.
Figure 5B:
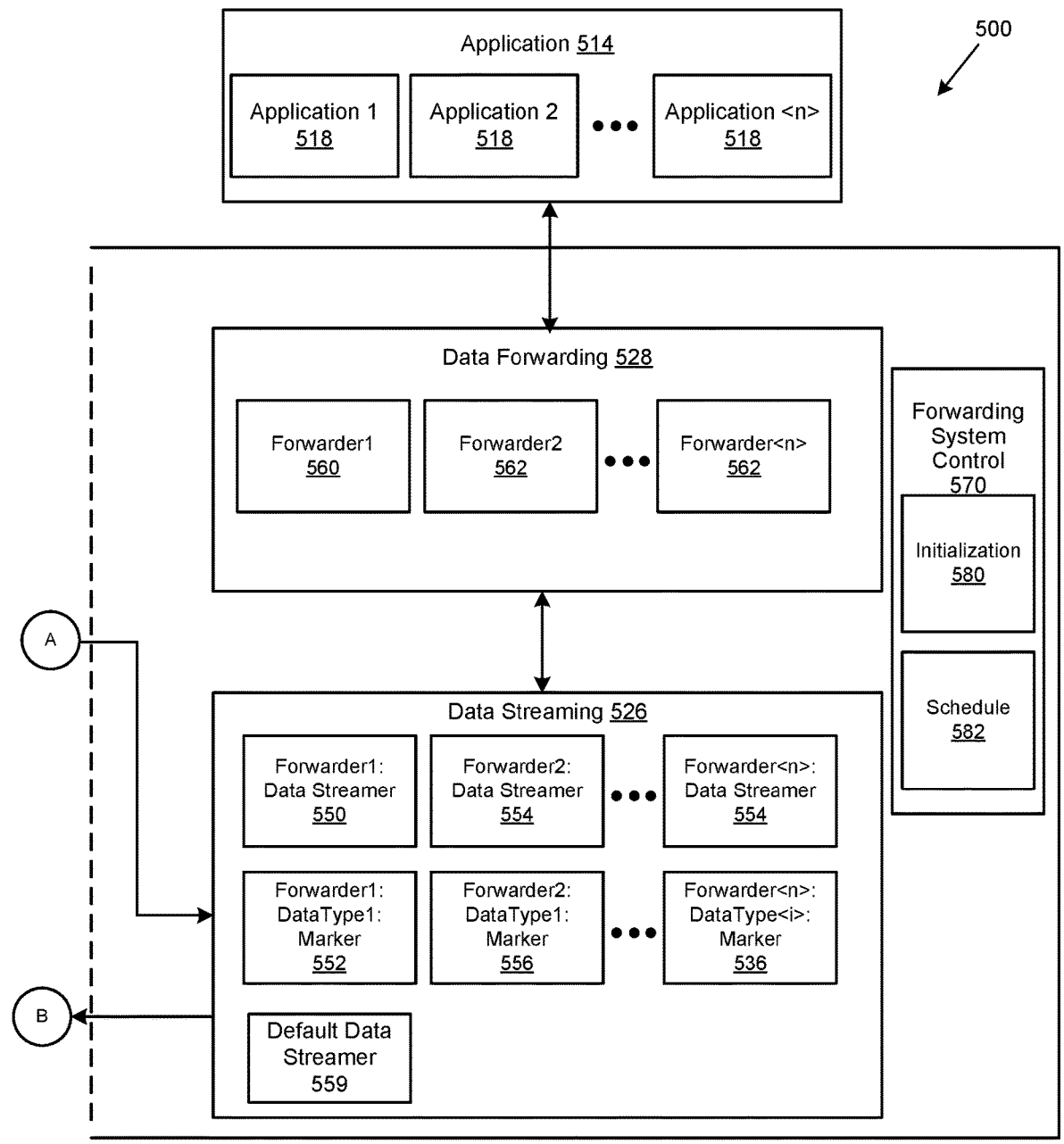

FIGS. 5A and 5B, generally referred to as FIG. 5, show a simplified block diagram of an extensible data forwarding environment 500. More specifically, the extensible data forwarding environment 500 includes a data retrieval portion 510, an extensible data forwarding system 512 and an application portion 514. The data retrieval portion 510 includes one or more data sources 516 (e.g., Data 1, Data 2, through Data <n>) providing respective data sets. In certain embodiments, one or more of the data sources 516 correspond to particular data center assets. The application portion 514 includes one or more applications 518 (e.g., Application 1, Application 2, through Application <n>). The extensible data forwarding system 512 includes a data marker component 520, a data collection component 522, a data formatter component 524, a data streaming component 526 and a data forwarding component 528.

The data marker component 520 receives information from the data retrieval portion 510. In certain embodiments, the data marker component 520 receives information from the data streaming component 526. In certain embodiments, the information received form the data streaming component includes one or more updated synchronization markers associated with respective data sets.

The data marker component 520 provides information to the data collection component 522. In certain embodiments, the provided information includes query sync marker information. The data collection component 522 also receives information from the data retrieval portion 510. In certain embodiments, the received information includes data sets collected for a particular forwarder. In certain embodiments, the received information is collected at a particular schedule for a particular forwarder.

The data collection component 522 provides information to the data format component 524. In certain embodiments the information provided includes raw data collected for a particular forwarder. In certain embodiments, the provided raw data is collected at a particular schedule for a particular forwarder.

The data formatter component 524 provides information to the data streaming component 526. In certain embodiments, the provided information includes specifically formatted data for a particular forwarder. The data streaming component 526 provides information to the data forwarding component 528. In certain embodiments, the information provided incudes a data stream of specifically formatted data for a particular forwarder. The data forwarding component 528 then provides information to the application component. In certain embodiments, the information provided is forwarded to a particular application (e.g., a respective application 518) within the application portion 514. Examples of applications to which the data is forwarded include the monitoring and management application 238, functions executing within the data center monitoring and management console 118, one or more CMS services 422 and one or more data center services 432.

The data collection component 522 identifies schedules, configurations, data collectors and/or default collectors to be used by the extensible data forwarding system 512. When a schedule for forwarding data is initiated, data is collected based upon an identified collector configuration and a forwarder configuration. More specifically, the data collection component 522 identifies a first schedule configuration 530 and a first data collector configuration 532 for a first data forwarding recipient. In certain embodiments, the data collection component 522 identifies additional schedule configurations 534 (e.g., 2-i schedule configurations) and additional data collector configuration 536 (e.g., 2-i schedule configurations) for respective data forwarding recipients. In certain embodiments, the data collection component 522 includes a default collector component 539. In certain embodiments, the default collector component 539 generates default schedule configurations and data collector configurations.

The data format component 524 formats the data sets to be used by the extensible data forwarding system 512. More specifically, the data format component 524 formats a first data format 540 for a first data forwarding recipient. In certain embodiments, the data format component 524 identifies additional format configurations 542 (e.g., 2-i format configurations) for respective data forwarding recipients. In certain embodiments, the data format component 524 includes a default data formatter component 546. In certain embodiments, the default data formatter component 546 generates default data format configurations.

In certain embodiments, data collection can be one of two types of data collection. For example, data collection can be of an incremental data collection type and a complete data collection type. With an incremental data collection type, data is collected according to an incremental data transfer schedule. With a complete data collection type, data is collected according to a full data transfer schedule.

With an incremental data collection type, only data which represents a change from data collected during a previously scheduled data collection event is collected during a currently schedule data collection event. In certain embodiments, an incremental data collection type data collection can be supported by maintaining the markers for each type of data for each forwarder. For example, the markers might be maintained as one or both of in row of a database table or as a last log marker for a log document. With a complete data collection type, data sets are collected corresponding to one or both of forwarder specific formatters and default formatters. Formatters format the collected data using a customized formatter within the data format component 524 if it exists otherwise the data format component 524 uses the default formatter component 546.

The data streaming component 526 identifies data streams and data markers to be used by the extensible data forwarding system 512. The data streaming component 526 generates custom data streamers and default streamers for the collected data sets. The data streaming component 526 streams formatted data to the forwarders and sets or resets the data sync markers based on data forwarding status of a data forwarder. In certain embodiments, the data sync markers can be reset to a previous state to avoid data loss because a next transfer will be from the reset data sync markers. More specifically, the data streaming component 526 identifies a first data stream 550 and a first data marker 552 for a first data forwarding recipient. In certain embodiments, the data streaming component 526 identifies additional data streams 554 (e.g., 2-i data streams) and additional data makers 556 (e.g., 2-i data markers) for respective data forwarding recipients. In certain embodiments, the data streaming component 526 includes a default streaming component 559. In certain embodiments, the default streaming component 559 generates default data streams and data markers.

The data forwarding component 528 forwards the data sets to be used by the extensible data forwarding system 512. The forwarding component 528 includes one or more data forwarders, each having knowledge of how to communicate with a particular recipient. The data forwarders receive data streams from the data streaming component 526 and forwards the data to destinations (e.g., external applications). The forwarding component 528 also sends an acknowledgement that the streams were forwarded to the data streaming component 526. More specifically, the data forwarding component 528 forwards a first data set 560 for a first data forwarding recipient. In certain embodiments, the data forwarding component 524 forwards additional data sets 562 (e.g., 2-i data sets) for respective data forwarding recipients.

In certain embodiments, one or more of the default collector component 539, default data formatter component 546 and the default data streaming component 559 are used when a forwards function does not have specific collection, formatting or streaming requirements.

In certain embodiments, the extensible data forwarding system 512 includes a forwarding system control component 570. In certain embodiments, the forwarding system control component 570 interact with and control the data marker component 520, the data collection component 522, the data format component 524, the data streaming component 526 and the forwarding component 528. In certain embodiments, the control component 570 includes an initialization module 580 and a schedule module 582.

Figure 6:
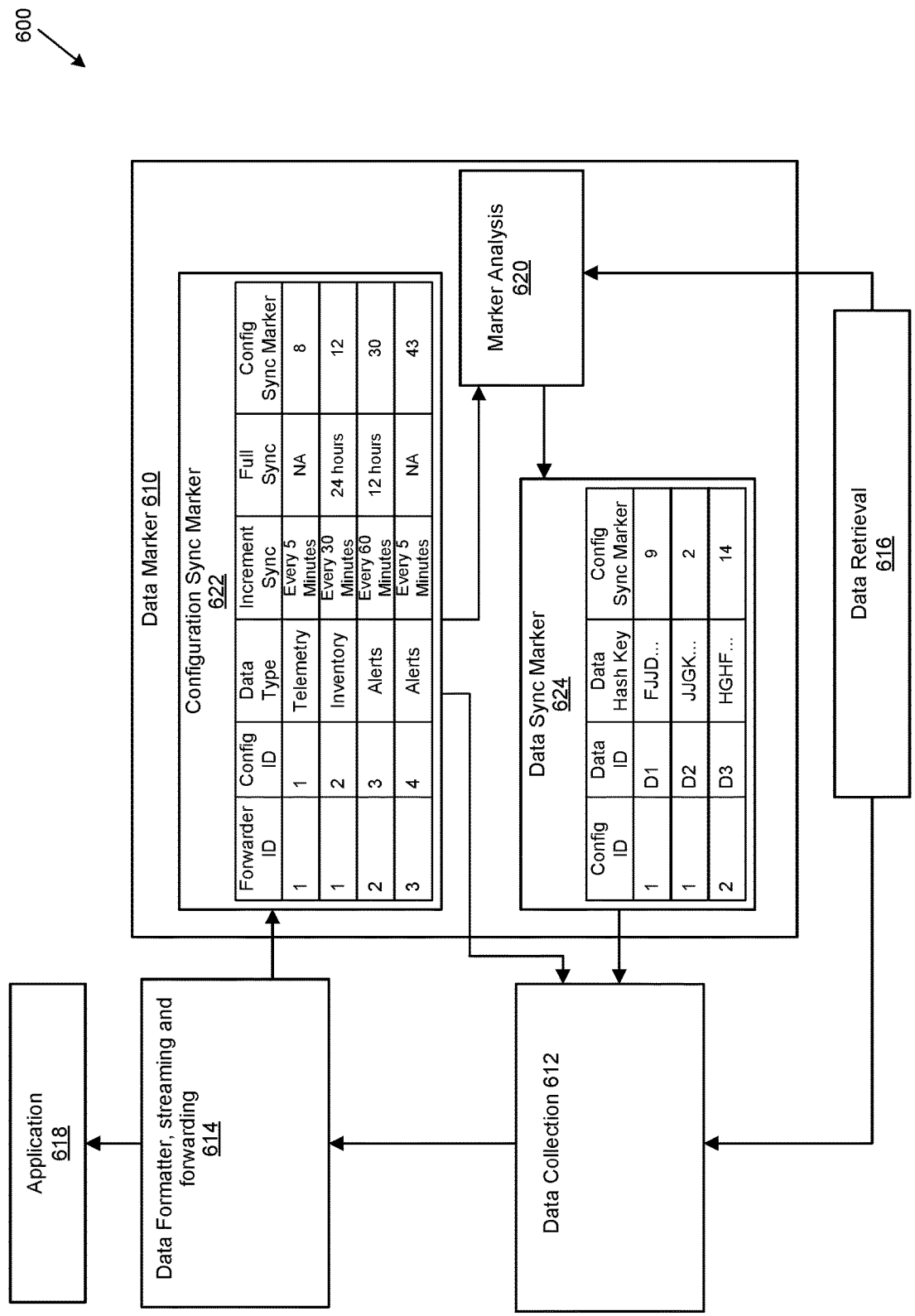
FIG. 6 shows a simplified block diagram of a data sync marker component.

FIG. 6 shows a simplified block diagram of a data marker environment 600. In certain embodiments, the data marker environment 600 includes a data marker component 610 which interacts with a data collection component 612 and a data formatting, streaming and forwarding component 614 as well as a data retrieval portion 616 and an application portion 618. In certain embodiments, the data marker component 610 corresponds to data marker component 520. In certain embodiments, the data collection component 612 corresponds to data collection component 522. In certain embodiments, the data format, streaming and forwarding component 614 corresponds to some or all of the data format component 524, the data streaming component 526 and the forwarding component 528. In certain embodiments, the data retrieval portion 616 corresponds to data retrieval portion 510. In certain embodiments, application portion 518 corresponds to application portion 514.

The data marker component 610 includes a marker analysis module 620, a configuration sync marker component 622 and a data synch marker component 624. In certain embodiments, the marker analysis module 620 analyzes a previously collected data set versus presently collected data set to determine if any change has occurred between the data sets.

In certain embodiments, the analysis identifies incremental changes between the data sets. In certain embodiments, the analysis includes generating hash values for the previously collected data set and the presently collected data set. In certain embodiments, the analysis includes comparing the hash values for the previously collected data set and the presently collected data set to determine whether the data sets have changed.

In certain embodiments, the configuration sync marker component 622 includes a repository of configuration sync marker information. In certain embodiments, the configuration sync marker information includes one or more of a forwarder identifier, a configuration identifier, a data type indicia, an incremental sync indicia, a full sync indicia and a configuration sync marker. In certain embodiments, the data type indicia includes one or more of a telemetry data type indica, an inventory data type indicia, and an alert type data indicia. In certain embodiments, the incremental sync indicia provides information regarding a frequency of data collection (e.g., every 5 minutes, every 24 hours, every 60 minutes). In certain embodiments, the full sync indica provides information regarding whether a full sync data collection operation is performed for a particular data set as well as information regarding frequency of such a full sync data collection operation (e.g., NA (indicating that a full sync operation is not to be performed for a particular data set), 24 hours, 12 hours).

In certain embodiments, the data sync marker component 624 includes a repository of data sync marker information. In certain embodiments, the data sync marker information includes one or more of a configuration identifier, a data set identifier, an incremental sync analysis result and a data sync marker. In certain embodiments the incremental synch analysis result provides information regarding a difference between a previous collected data set and a present collected data set. In certain embodiments, the data sync marker provides version information regarding a particular collected data set. In certain embodiments, the version information represents a particular increment of the particular collected data set.

In certain embodiments, the marker analysis module 620 applies a hashing algorithm on collected data sets to calculate a hash key for each respective collected data set. In certain embodiments, the hashing algorithm includes a secure hash algorithm 256 (SHA-256) which generates a hash value that is 256 bits long. In certain embodiments, the marker analysis module 620 uses the hash keys to detect changes in the respective collected data sets.

More specifically, if there is no existing data set hash key, then the calculated data set hash key is inserted into the data sync marker component 614. In certain embodiments, the data set hash key is inserted into the incremental sync analysis result portion of the data sync marker component 614. In certain embodiments, the data set hash key and the version information regarding the data set are inserted into the data sync marker component 614 for a particular data set. In certain embodiments, the version information monotonically increases with each data set update.

When performing the analysis, when an existing data hash key is different to the calculated hash key for the present data set, then the marker analysis module 620 updates the data set hash key with the newly calculated data set hash key and increments the data sync marker for the particular data set. When performing the analysis, when an existing data hash key equals the calculated hash key for the present data set, then the marker analysis module 620 ignores the presently collected data set.

The data collection component 612 schedules a data set collection operation. For example, the data collection component 612 generates a scheduled trigger for Forwarder(i): Data Type (i). The data collection component 612 queries the data sync marker component 614 to obtain a data sync marker from the data collection component 624 and a config sync marker from the configuration sync marker component 622.

If the data sync marker is greater than the config sync marker (indicating the data set has been incrementally changed), then the data collection component 612 retrieves the updated data set from the data source and pushes the updated data set to the data formatting, streaming and forwarding component 614.

For example, for the data set identified with Forwarder identifier (1), Config identifier (2) and data type (Inventory), a change in the data set is indicated as the data sync marker is "14" and the config sync marker is "12." Representing that two incremental updates have occurred to this data set since the last scheduled data collection. Next, the data marker analysis module 610 updates the config sync marker value with the data sync marker value after successfully forwarding the data.

Figure 7:
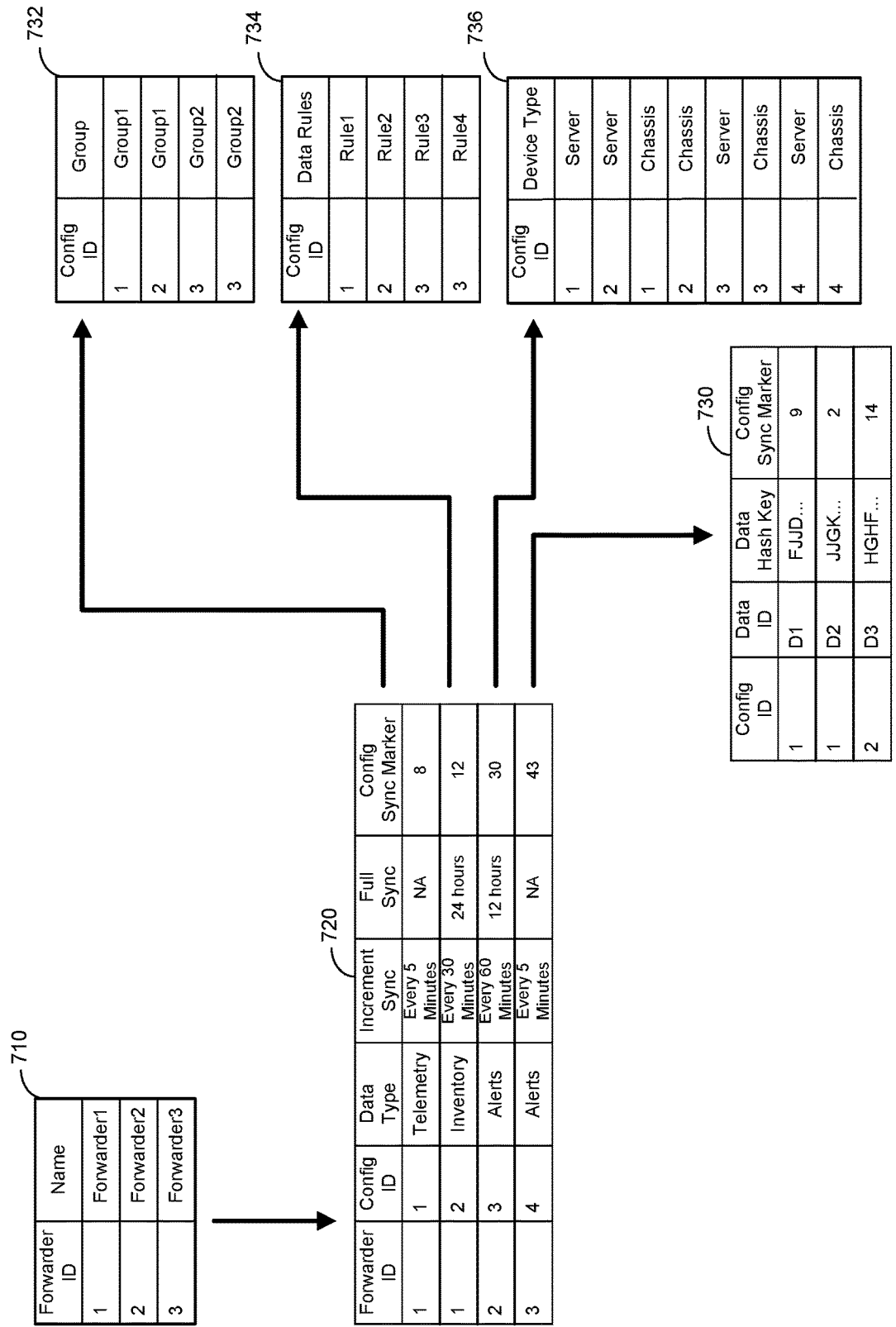
FIG. 7 shows a block diagram of a plurality of forwarder configurations.

For example, for the data set identified with Forwarder identifier (1), Config identifier (2) and data type (Inventory), the corresponding config sync marker is updated with the corresponding data sync marker (i.e., 14 in this example) to indicate the latest delta (i.e., incremental change to the data set) has been transferred successfully to a respective application within the application portion FIG. 7 shows a block diagram of a plurality of forwarder configurations 700 which are included within an extensible data forwarding system such as extensible data forwarding system 512. More specifically, an extensible data forwarding system can include a plurality of data forwarders stored within a forwarder repository 710. The forwarder repository 710 includes forwarder name information (Forwarder1, Forwarder2, Forwarder3) as well as corresponding forwarder identifiers (Forwarder id). As used herein, a data forwarder broadly refers to a component implemented to perform an extensible data forwarding operation, as described herein.

Each data forwarder has a corresponding forwarder configuration along with data collectors, formatters, streamers, forwarders and data attributes to filter the data. Each data forwarder configuration can have many to many relationships with data types, device types, groups and data attribute rules. These data forwarder configurations are used by the data collection component 522 to collect the data that corresponds to the configuration and by the data forwarding component 528 to forward the data that corresponds to the configuration to a particular recipient.

In certain embodiments, configuration sync marker information is stored within a configuration sync marker component repository 720. In certain embodiments, the configuration sync marker information includes one or more of a forwarder identifier, a configuration identifier, a data type indicia, an incremental sync indicia, a full sync indicia and a configuration sync marker. In certain embodiments, the data type indicia includes one or more of a telemetry data type indica, an inventory data type indicia, and an alert type data indicia. In certain embodiments, the incremental sync indicia provides information regarding a frequency of data collection (e.g., every 5 minutes, every 24 hours, every 60 minutes). In certain embodiments, the full sync indica provides information regarding whether a full sync data collection operation is performed for a particular data set as well as information regarding frequency of such a full sync data collection operation (e.g., NA (indicating that a full sync operation is not to be performed for a particular data set), 24 hours, 12 hours).

In certain embodiments, a data forwarder configuration is used in combination with the configuration sync marker information to generate a plurality of forwarder configurations. For example, the forwarder configurations can include one or more of a forwarder configuration to sync markers configuration, a forwarder configuration to groups configuration, a forwarder configuration to data rules configuration and a forwarder configuration to device types configuration. Data from each of the configurations are stored in respective repositories, e.g., a forwarder configuration to sync markers repository 730, a forwarder configuration to groups repository 732, a forwarder configuration to data rules repository 734 and a forwarder configuration to device types repository 736.

Each repository includes configuration identification identifiers as well as data relating to the particular forwarder configuration. For example, an entry in the forwarder configuration to data sync marker repository includes a configuration identifier, a data set identifier, an incremental sync analysis result and a data sync marker. An entry in the forward configuration to groups repository includes a configuration identifier and data corresponding to a particular group (e.g., Group1, Group2, Group3). As used herein, a group refers to a set of devices (e.g., data center assets) having something in common (e.g., physical proximity within a data center, physical commonality (e.g., devices each of which include a particular component such as a particular processor), logical commonality (e.g., executing similar workloads) An entry in the forwarder configuration to data rules repository 734 includes a configuration identifier and data corresponding to a particular rule (e.g., Rule1, Rule2, Rule3, Rule4). As used herein, a rule refers to one or more conditions that when met satisfy the rule. In certain embodiments, the conditions can include combinations of conditions such as when an alert is raised for a particular device type. An entry in the forwarder configuration to device types repository 734 includes a configuration identifier and data corresponding to particular device types (e.g., Server, Chassis). As used herein, a device type refers to a particular category of devices (e.g., data center assets) such as a server category, a storage category and a chassis category.

The data contained within each of the repositories is then used to forward the data to a particular recipient. In certain embodiments, the particular recipient includes on or more applications. Examples of applications to which the data is forwarded include the monitoring and management application 238, functions executing within the data center monitoring and management console 118, one or more CMS services 422 and one or more data center services 432.

Figure 8:
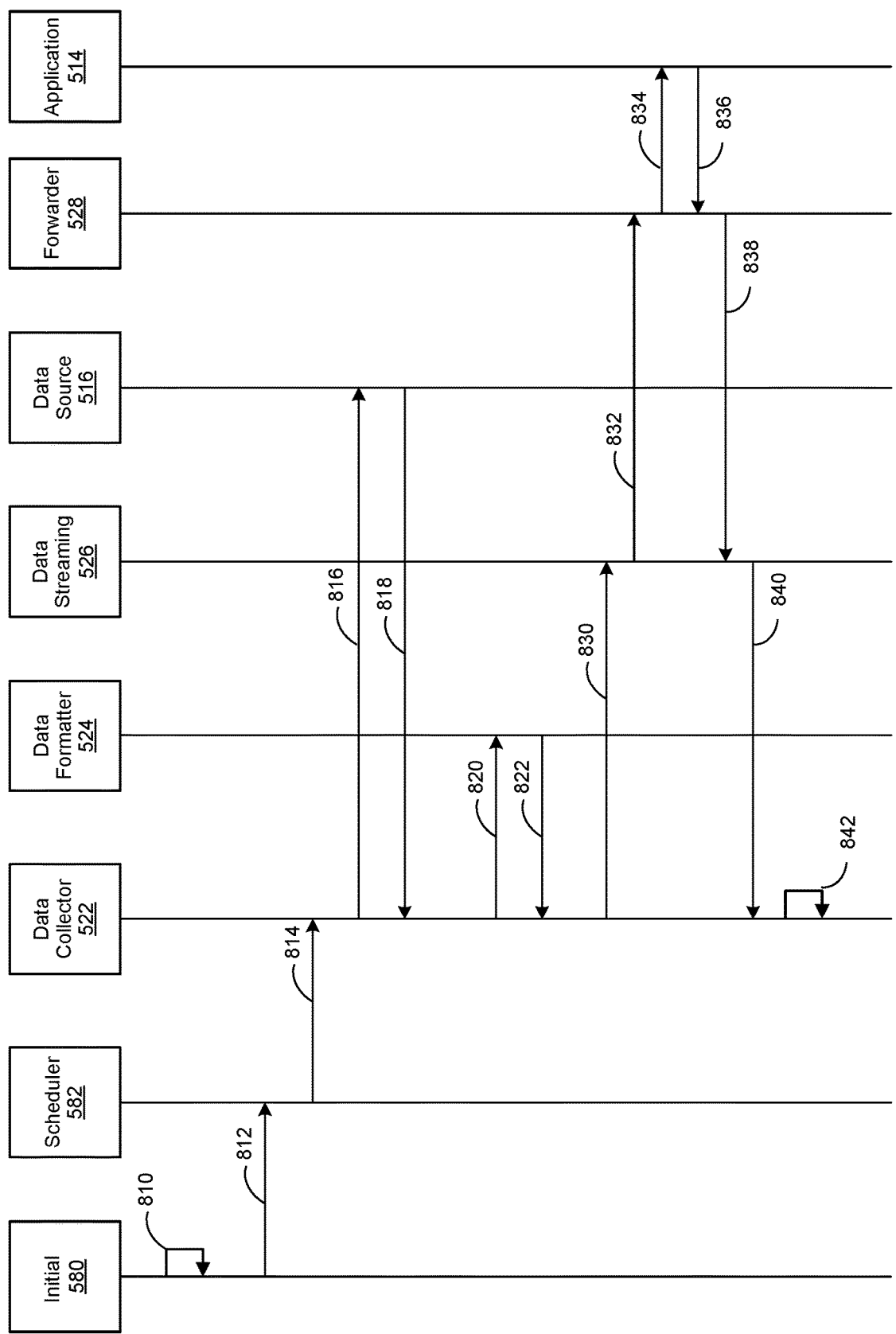
FIG. 8 shows a sequence diagram in performance of a data center monitoring and management operation including an extensible data forwarding operation.

FIG. 8 shows a sequence diagram in performance of a data center monitoring and management operation including an extensible data forwarding operation. More specifically, the extensible data forwarding operation begins with the initialization module 580 loading configuration information for each data forwarder at step 810. In certain embodiments, the configuration information includes one or more of a schedule, a data type, a data format and streaming details for each data forwarder. Next, the configuration information is pushed to the scheduling module 582 at step 812. The scheduling module 582 controls the timing of the collection of data from the various data sources. In certain embodiments, the timing may be defined by the schedule loaded via the initialization module 580. In certain embodiments, the schedule defines sync timing such as incremental sync timing and the full sync timing.

Next, at step 814 the scheduling module 582 provides information to the data collection component 522 regarding collecting data for a particular data forwarder (data forwarder(i)) for a particular data type (data type(i)). Next at step 816 the data collection component 522 communicates with the data source 516 and identifies data to be collected based upon the data forwarder configuration. If the data collection is an incremental data collection then the data collection component 522 also uses the previous sync marker to determine which data to collect. The data source 516 then provides the identified data to the data collection component 522 at step 818. The data collection component 522 then provides the collected data to the data formatter component 524 at step 820. The data formatter component 524 formats the data according to the data forwarder configuration at step 822. For example, the data formatter component can format the data according to a particular data type associated with the data forwarder configuration. The data formatter component 524 provides the formatted data to the data collection component 522. The data collection component 522 provides the formatted data to the data streaming component 526 at step 830.

The data streaming component 526 then provides the streaming data types to the data forwarding component 528 at step 832. The data forwarding component 528 then transfers the streaming data types to the data recipient (e.g., an application of application portion 514) at step 834. The recipient provides an indication to the data forwarding component 522 that the data was successfully received at step 836. The data forwarding component 522 then provides an indication to the data streaming component 526 that the data was successfully received by the recipient at step 838. The data streaming component 526 then provides an indication to the data collection component 522 that the data was successfully received by the recipient at step 840. Upon receipt of the indication, the data collection component 522 then updates the sync markers at step 842 and the extensible data forwarding operation completes.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a data center management and monitoring operation, comprising:

identifying data forwarder configuration information for a plurality of data forwarders, the forwarder configuration information including scheduling information, each of the plurality of data forwarders having knowledge of how to communicate with a particular recipient;

scheduling collection of data from a data source according to the scheduling information, the data source comprising a data center asset contained within a data center;

collecting data from a data source based upon the scheduling, the collecting using the forwarder configuration information to identify the data to be collected;

formatting the data collected from the data source according to the data forwarder configuration information to provide formatted data; and, forwarding the formatted data to a recipient.

2. The method of claim 1, further comprising:
the scheduling includes one or more of an incremental data transfer schedule and a full data transfer schedule.

3. The method of claim 2, further comprising:
maintaining a marker for data collected according to the incremental data transfer schedule.

4. The method of claim 3, wherein:
the marker is incremented for each incremental collection of data.

5. The method of claim 2, further comprising:
applying a hashing algorithm on for each incremental collection of data.

6. The method of claim 5, further comprising:
using the hashing value to detect changes in incrementally collected data.

7. A system comprising:
a processor;
a data bus coupled to the processor;
a data center asset client module; and,
a non-transitory, computer-readable storage medium embodying computer program code, the non-transitory, computer-readable storage medium being coupled to the data bus, the computer program code interacting with a plurality of computer operations and comprising instructions executable by the processor and configured for:

identifying data forwarder configuration information for a plurality of data forwarders, the forwarder configuration information including scheduling information, each of the plurality of data forwarders having knowledge of how to communicate with a particular recipient;

scheduling collection of data from a data source according to the scheduling information, the data source comprising a data center asset contained within a data center;

collecting data from a data source based upon the scheduling, the collecting using the forwarder configuration information to identify the data to be collected;

formatting the data collected from the data source according to the data forwarder configuration information to provide formatted data; and, forwarding the formatted data to a recipient.

8. The system of claim 7, wherein the instructions executable by the processor are further configured for:
the scheduling includes one or more of an incremental data transfer schedule and a full data transfer schedule.

9. The system of claim 8, wherein the instructions executable by the processor are further configured for:
maintaining a marker for data collected according to the incremental data transfer schedule.

10. The system of claim 9, wherein:
the marker is incremented for each incremental collection of data.

11. The system of claim 8, wherein the instructions executable by the processor are further configured for:
applying a hashing algorithm on for each incremental collection of data.

12. The system of claim 11, wherein the instructions executable by the processor are further configured for:
using the hashing value to detect changes in incrementally collected data.

13. A non-transitory, computer-readable storage medium embodying computer program code, the computer program code comprising computer executable instructions configured for:

identifying data forwarder configuration information for a plurality of data forwarders, the forwarder configuration information including scheduling information, each of the plurality of data forwarders having knowledge of how to communicate with a particular recipient;

scheduling collection of data from a data source according to the scheduling information, the data source comprising a data center asset contained within a data center;

collecting data from a data source based upon the scheduling, the collecting using the forwarder configuration information to identify the data to be collected;

formatting the data collected from the data source according to the data forwarder configuration information to provide formatted data; and, forwarding the formatted data to a recipient.

14. The non-transitory, computer-readable storage medium of claim 13, wherein the computer executable instructions are further configured for:
the scheduling includes one or more of an incremental data transfer schedule and a full data transfer schedule.

15. The non-transitory, computer-readable storage medium of claim 14, wherein the computer executable instructions are further configured for:
maintaining a marker for data collected according to the incremental data transfer schedule.

16. The non-transitory, computer-readable storage medium of claim 15, wherein:
the marker is incremented for each incremental collection of data.

17. The non-transitory, computer-readable storage medium of claim 14, wherein the computer executable instructions are further configured for:
applying a hashing algorithm on for each incremental collection of data.

18. The non-transitory, computer-readable storage medium of claim 17, wherein the computer executable instructions are further configured for:
using the hashing value to detect changes in incrementally collected data.

19. The non-transitory, computer-readable storage medium of claim 13, wherein:
the computer executable instructions are deployable to a client system from a server system at a remote location.

20. The non-transitory, computer-readable storage medium of claim 13, wherein:
   the computer executable instructions are provided by a service provider to a user on an on-demand basis.

\* \* \* \* \*